United States Patent [19]
Reitz

[11] Patent Number: 5,649,182
[45] Date of Patent: Jul. 15, 1997

[54] APPARATUS AND METHOD FOR ORGANIZING TIMELINE DATA

[76] Inventor: Carl A. Reitz, 8820 Deer Run Dr., Indianapolis, Ind. 46256

[21] Appl. No.: 405,733

[22] Filed: Mar. 17, 1995

[51] Int. Cl.$^6$ .................................................. G06F 17/30
[52] U.S. Cl. ................................. 395/607; 395/609
[58] Field of Search .............................. 395/600, 607, 395/609

[56] References Cited

U.S. PATENT DOCUMENTS

| | | | |
|---|---|---|---|
| 3,999,050 | 12/1976 | Pitroda | 364/705.08 |
| 4,852,042 | 7/1989 | Zur Muhlen et al. | 395/224 |
| 4,881,179 | 11/1989 | Vincent | 340/825 |
| 4,899,299 | 2/1990 | MacPhail | 364/570 |
| 5,023,851 | 6/1991 | Murray | 368/41 |
| 5,070,470 | 12/1991 | Scully | 364/705.08 |
| 5,129,057 | 7/1992 | Strope et al. | 395/348 |
| 5,182,705 | 1/1993 | Barr et al. | 395/211 |
| 5,202,984 | 4/1993 | Kashio | 395/616 |
| 5,208,748 | 5/1993 | Flores | 364/419 |
| 5,212,639 | 5/1993 | Sampson et al. | 395/230 |
| 5,216,603 | 6/1993 | Flores et al. | 364/419 |
| 5,222,209 | 6/1993 | Murata et al. | 395/346 |
| 5,297,249 | 3/1994 | Bernstein | 395/156 |
| 5,339,392 | 8/1994 | Risberg et al. | 395/333 |
| 5,367,452 | 11/1994 | Gallery et al. | 395/228 |

OTHER PUBLICATIONS

Korth and Silberschatz, Database System Concepts 2/E, 1991 p. 53.

Primary Examiner—Thomas G. Black
Assistant Examiner—Donald Min
Attorney, Agent, or Firm—Woodard Emhardt Naughton Moriarty & McNett

[57] ABSTRACT

An apparatus and method for organizing timeline data includes a computer system having a software program associated therewith capable of receiving a plurality of data messages associated with a calendar date and organizing each of the plurality of data messages in a timeline in accordance with its corresponding calendar date. Each data message and corresponding calendar date is stored as a separate record in a database. Each data message may further include a time of day associated therewith so that the data messages may further be organized in the timeline in accordance with the time of day associated with each data message. Each data message may further include a number of filtering identifiers associated therewith such that subsets of the data messages may be generated having filtering identifiers in common with desired filtering criteria, wherein any data message subset generated is organized in a timeline by calendar date and time of day.

38 Claims, 16 Drawing Sheets

APPARATUS AND METHOD FOR ORGANIZING TIMELINE DATA

FIELD OF THE INVENTION

The present invention relates generally to computer systems for organizing data, and more specifically to such systems wherein data messages are organized in a timeline in accordance with a calendar date and time of day associated with each data messages.

BACKGROUND OF THE INVENTION

Computer systems implementing windows-based application software programs are well known in the art. A wide variety of such application programs are available for performing a multiplicity of functions. For example, such programs exist for providing word processing functions, spreadsheet functions, alarm clock functions and calendar functions, to name a few. However, none of the prior art programs offers the ability to enter Notepad information such as personal, academic or business notes, in a random manner for later organization.

Organizing the flood of information and events that one encounters every day is critically important in enabling one to follow through with necessary and related tasks in a timely and efficient manner. What is therefore needed is a computer system that operates as a computer Notepad and that permits post entry organization of Notepad entries. Such a computer Notepad should permit a user to input notes relating to a variety of identifiers at any time, and then permit the user to organize the data messages in a timeline according to the calendar date of each of the data messages. The user should further be able to generate subsets of the timeline data in accordance with desired identifier criteria.

SUMMARY OF THE INVENTION

The present invention addresses the foregoing shortcomings of the prior art. In accordance with one aspect of the present invention, a computer system for organizing a plurality of data messages wherein each of the data messages has a particular calendar date associated therewith comprises a database for storing the data messages and associated calendar dates, wherein the database stores each of the data messages and associated calendar dates as a separate database record, means for entering the plurality of data messages and associated calendar dates into the database, and a processor operable to automatically organize the database records in a timeline sequence according to the calendar date associated with each of the database records regardless of the order in which the plurality of data messages were entered into the database.

In accordance with another aspect of the present invention, a method of organizing data with a computer having means for entering the data, a database for storing the data, and means for displaying the data comprises the steps of: (1) entering the data into the computer database, (2) entering a particular calendar date to be associated with the data into the computer database, (3) repeating steps (1) and (2) for data associated with a plurality of calendar dates, and (4) displaying the data such that each of the plurality of data entries is sequentially organized by its associated calendar date.

In accordance with a further aspect of the present invention, a computer system for organizing a plurality of data messages having a calendar date and a number of filtering identifiers associated therewith comprises a database for storing the data messages, associated calendar date, and associated number of filtering identifiers, wherein the database stores each of the data messages, associated calendar date and associated number of filtering identifiers in a separate database record, means for entering the plurality of data messages, associated calendar date and associated number of filtering identifiers into the database, means for entering filtering criteria corresponding to any of the filtering identifiers associated with any of the plurality of database records, and a processor operable to receive the filtering criteria and generate a subset of the database records having filtering identifiers in common with the filtering criteria, wherein the subset of database records are organized in a timeline sequence according to the calendar date associated with each of the database records in the subset regardless of the order in which the plurality of data messages were entered into the database.

In accordance with yet a further aspect of the present invention, a method of organizing a plurality of data messages with a computer having means for entering the plurality of data messages along with a calendar date and a number of filtering criteria associated with each of the plurality of data messages, and a database for storing each data message, associated calendar date and associated filtering identifiers as a single database record comprises the steps of: (1) entering a data message, associated calendar date and associated number of filtering identifiers into the computer database, (2) repeating step (1) for a plurality of data messages having any calendar date associated therewith, and (3) selecting any number of filtering criteria such that only data messages having filtering identifiers in common with the selected filtering criteria are formed into a data message subset, and such that each of the data entries in the subset is sequentially organized by its associated calendar date.

One object of the present invention is to provide a computer system with the capability of receiving a plurality of data messages each having a calendar date associated therewith and organizing the plurality of data messages in a timeline in accordance with the various calendar dates.

Another object of the present invention is to provide a computer system with the capability of receiving a plurality of data messages each having a calendar date and a number of filtering identifiers associated therewith, and generating subsets of the plurality of data messages having filtering identifiers in common with a desired filtering criteria wherein each data message subset is organized in a timeline in accordance with the calendar dates associated with each of the data messages.

These and other objects of the present invention will become more apparent from the following description of the preferred embodiment.

DESCRIPTION OF THE PREFERRED EMBODIMENT

Figure 1:
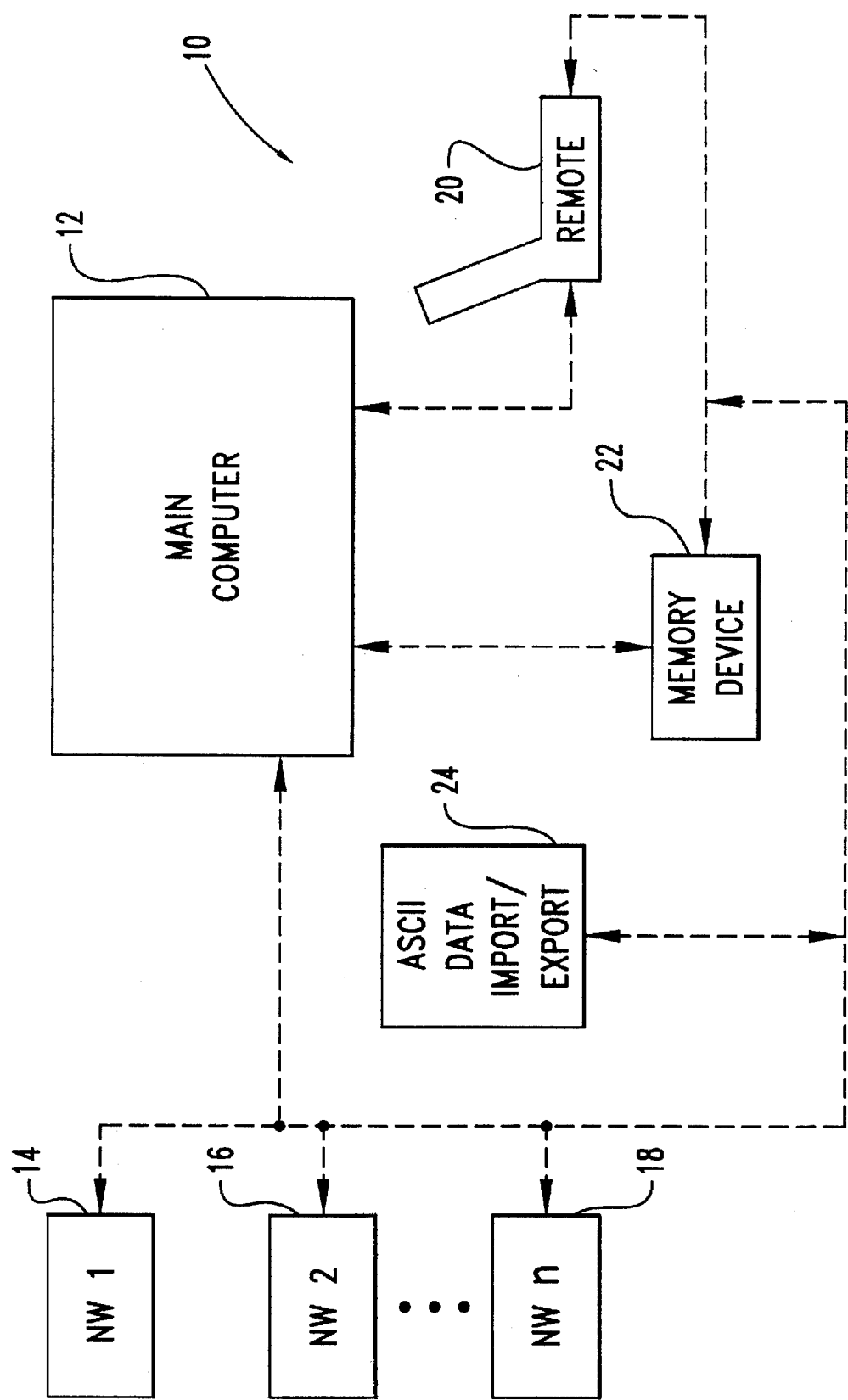
FIG. 1 is a block diagram of various computer system setups for implementing the software program that forms a part of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a computer system 10 for running the Timeline Notepad software program of the present invention, is shown. The computer system set up 10 includes at least a main computer 12 for running the software algorithm. In one embodiment, main computer 12 is a personal computer (PC) capable of running Windows-based software routines such as Microsoft Windows™. In an alternate embodiment, main computer 12 is a PC or other system that is networked with a multiplicity of computers NW1 14 through NWn 18, where n is the number of networking computers. In this embodiment, both the main computer 12 and the network computers NW1-NWn should be capable of running a Windows-based program. Computers 12–18 may be part of a local-area-network (LAN) or wide-area-network (WAN). As will be explained in more detail hereinafter, each of the network computers NW1-NWn may exchange data related to the Timeline Notepad software program of the present invention.

In each of the foregoing embodiments, any of the computers 12–18 may further act as a docking station for a lap-top, notebook, or similar remote computer 20. Remote computer 20, as with computers 12–18, must be capable of running a Windows-based program such as Microsoft Windows™. With computer set up such system 10, the Timeline Notepad software program of the present invention may be run "off-line" with remote computer 20. Either through the use of a docking station or memory device 22, such as a data storage disk, hard disk, tape drive, RAM, ROM, or other memory unit, data generated "off-line" can be imported into the main computer 12, or network computers NW1-NWn, to update the Timeline Notepad data contained therein. Similarly, data generated "on-line" with any of the computers 12–18 may be exported to remote computer 20 for updating and/or editing.

The present invention further contemplates interfacing a generic data import/export device 24 with any of the computers 12–20 of system 10. In this way, data may be generated and/or edited "off-line" with various data generating devices and then subsequently loaded onto the system 10 in, for example, ASCII format. Likewise, data generated and/or edited "on-line" may be dumped to various off-line data storage/usage devices. In general, data may be exchanged with any of the computers 12–20 via hard-wire connection thereto, various memory dump techniques or via any of a multiplicity of remote data communications arrangements involving infrared, magnetic/inductive, electro-optic, radio, or other electro-magnetic data transfer as well as via a telephone modem or other data pattern recognition system. Data import/export devices 24 operating in the forgoing manner may include, for example, E-mail systems, Personal Digital Assistants (PDAs), Electronic calendar/organizers, watches, CD ROMS, accounting software interfaces, facsimile systems, hard copy data scanners, dictation equipment, telephone systems, alarm systems, emergency vehicle, military/space/commercial flight and other radio transmission systems, video recording systems, caller ID systems, Voice mail systems, alpha paging systems, Optical character recognition (OCR) systems, Smart House Data Logging systems, analog-to-digital convertors for event-specific real-time data capture. Various computer services may also be included within the class of data import/export devices 24 contemplated by the present invention including, for example, the Internet, various on-line computer services, system messages generated by Network Operating systems, and application interfaces resident within independent mini and/or mainframe computers. It is to be understood that the Timeline Notepad software program of the present invention may be adapted for use by an individual, large business, corporation, or any number of users therebetween.

Figure 2:
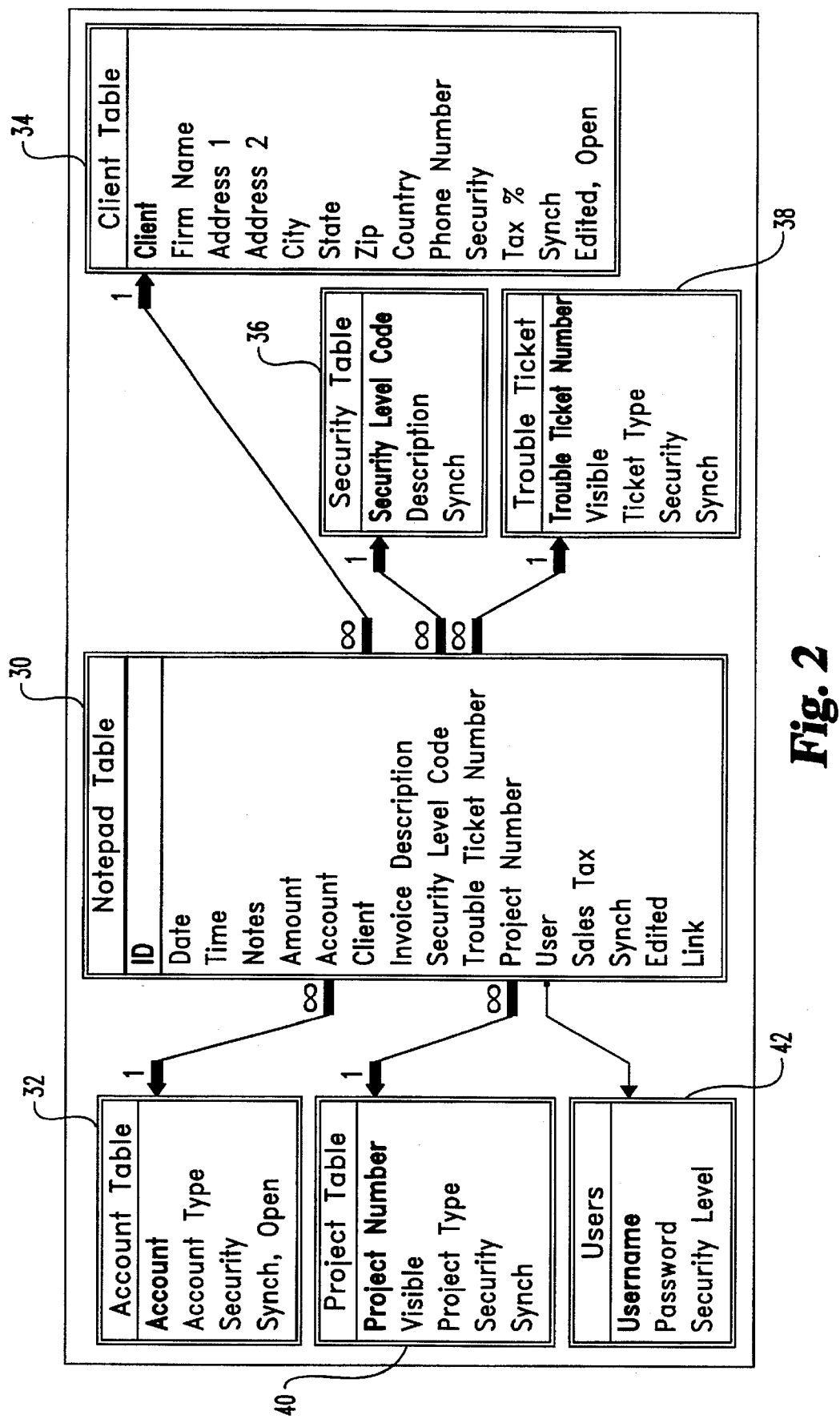
FIG. 2 is a block diagram showing a relational database layout for storing data in accordance with the present invention.

Referring now to FIG. 2, a preferred database layout for storing, retrieving and manipulating data in accordance with the present invention is shown. The database layout of FIG. 2 is a relational database format which links related data from different tables or storage areas to form a "data record". It should be noted that the user interface software program of the present invention is preferably written in Microsoft Access™. However, the present invention contemplates providing the software program in other languages as well, including, for example, Visual Basic. In any case, those skilled in the art will recognize that utilization of a relational database format provides users with the freedom to manipulate the data using built in functions and commands available from other known programs compatible with Microsoft Access ™ databases.

The relational database of FIG. 2 has as its central data table a Notepad table 30. Notepad table 30 includes a series of database "records" which correspond to data message entries having specified dates and times. Each Notepad table 30 entry, as will be more fully described hereinafter, may include information with regard to date, time, notes entered, dollar amount assigned, invoicing, sales tax, on/off line indicators (sync and edited), as well as a link corresponding thereto. Each Notepad table 30 entry may further include pointers to information contained in auxiliary tables with regard to accounts, clients, security codes, trouble tickets, projects and users.

An account table 32 includes account information such as account name, account type, security level associated with the account, and an on/off line indicator (sync). A client table 34 includes client information such as client (firm) name, address, phone number, security level associated therewith, taxing percentage associated therewith, and on/off line indicators (sync and edited). A security table 36 includes security level information such as security level codes, descriptions thereof and an on/off line indicator (sync). A trouble ticket table 38 includes trouble ticket information such as trouble ticket number and type, a ticket open/closed indicator, a security level associated therewith and an on/off line indicator (sync). A project table 40 includes project information such as project number and type, a project open/closed indicator, a security level associated therewith and an on/off line indicator (sync). Finally, a users table 42 includes user information such as user passwords and security levels assigned to each of the users.

Figure 3:
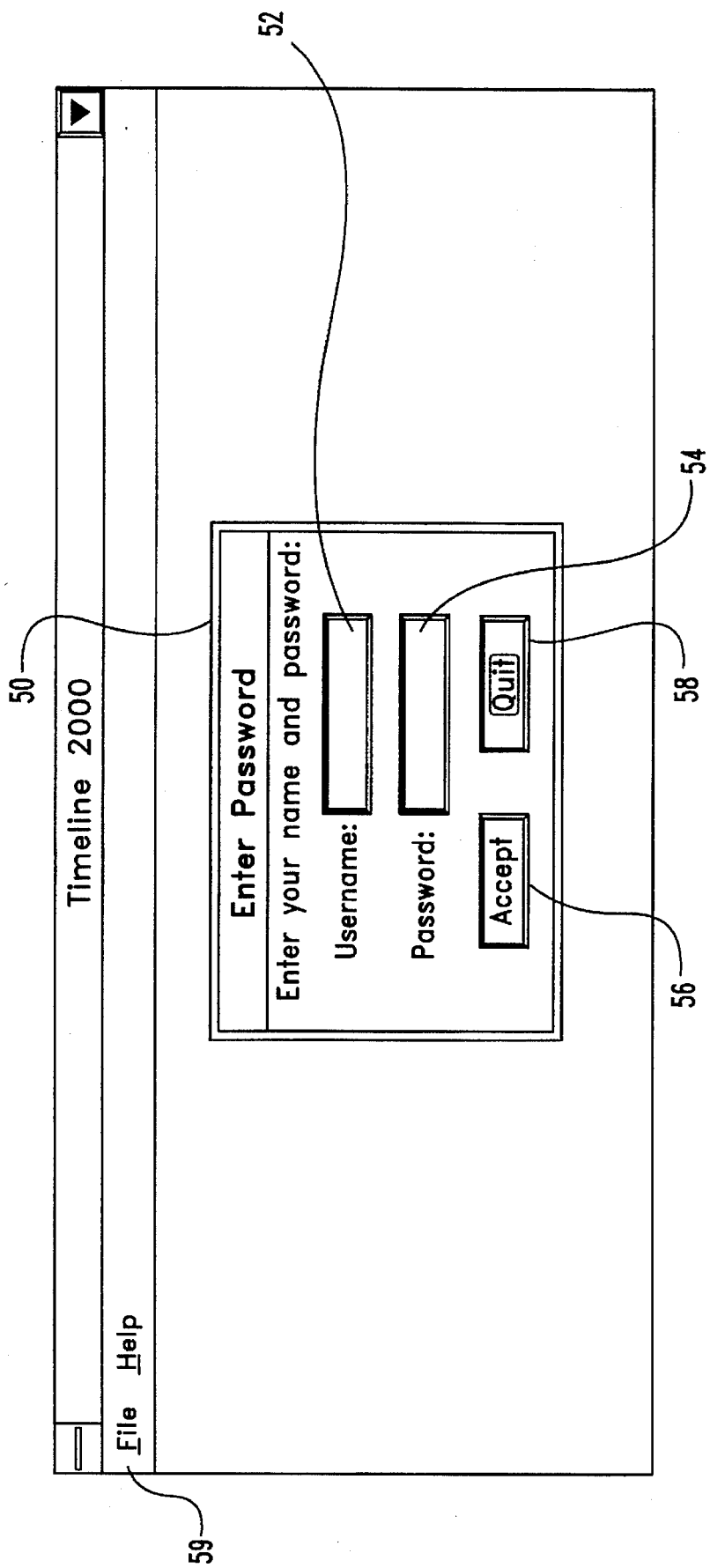
FIG. 3 is a log on screen of the user interface software program that forms a part of the present invention.

With reference to FIGS. 3–16, operation of the user interface, or Timeline Notepad software program, that forms a part of the present invention will now be described in detail. Referring to FIG. 3, the start up, or log on, window 50 of the user interface is shown. A user name 52 and password 54 are entered and the ACCEPT 56 option is selected to gain access to the program. It is to be understood that "selected", "chosen" and variations thereof used hereinafter may include a variety include a variety of known methods for activating a desired function. Preferably, the user interface includes a plurality of on-screen switches, as is commonly known in Windows applications, which may be activated by "clicking" on the switches with a control "mouse", or otherwise selecting and activating the switches with some type of operator input device. It is to be further understood that each of the foregoing screen displays has associated therewith the ability to edit, print, close the present application, quit the application, save data, and other functions commonly associated with Windows applications, which can be activated, in the foregoing manner, through the use of "pull-down" menus, such as pull-down menus 59, as is commonly known with Windows-based programs. A QUIT option 58 is also provided to thereby permit a user to quit the application from the log on window 50.

Figure 4:
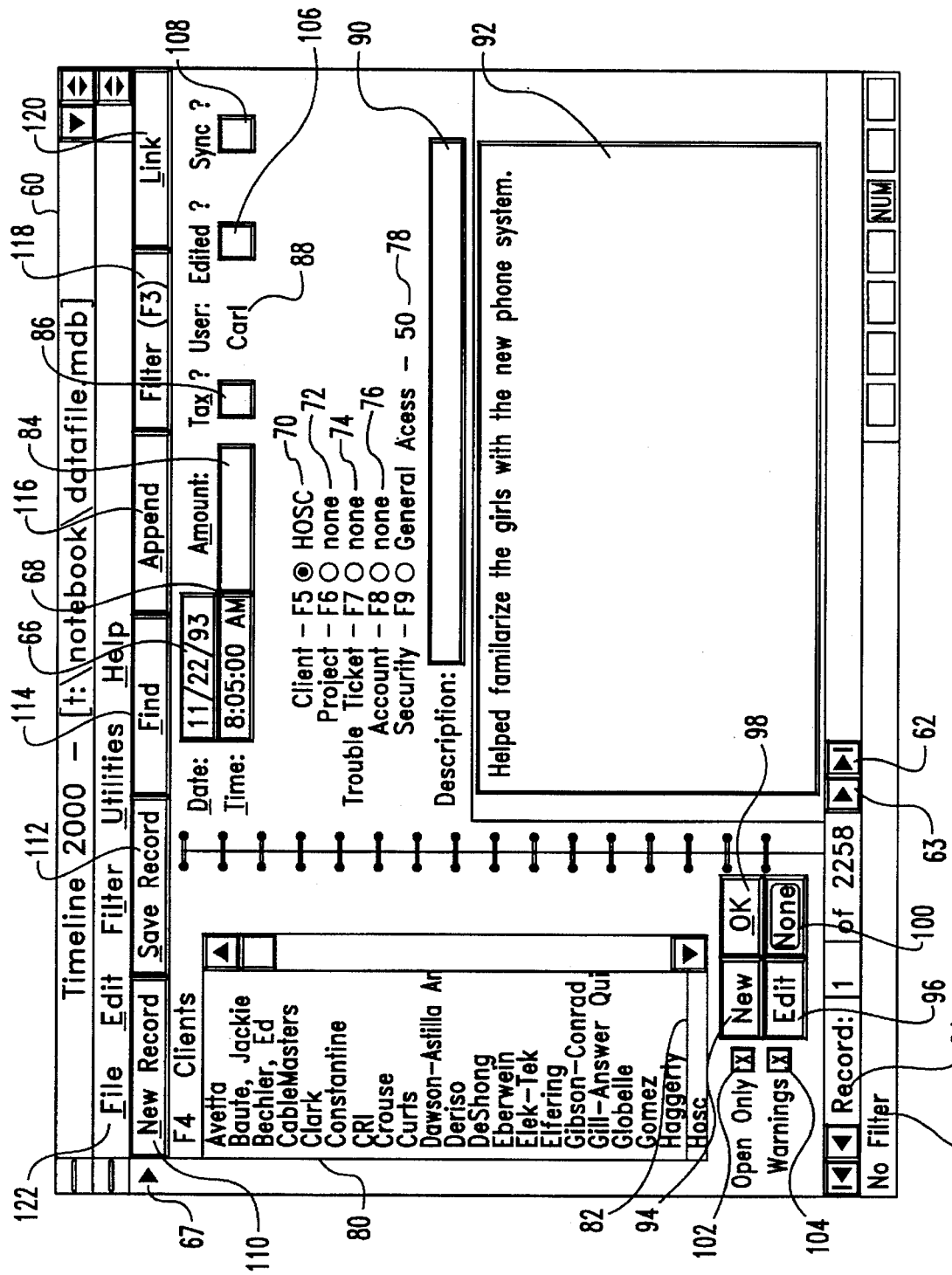
FIG. 4 is a Notepad message input window of the user interface.

Referring now to FIG. 4, the main Notepad window 60 appears after a properly executed log on. Individual entries to the Timeline Notepad software program of the present invention are entered and/or edited through this window. Consequently, most user time will be spent within this window making and reviewing entries. When window 60 is opened or queried, the last data record in the Notepad table 30 appears. As will become more apparent hereinafter, the last data record in any given set corresponds to the most recent (in date and time) record entered.

The date and time are two critical bits of information that the program uses to keep each record in time sequence order. The program inserts all data entered into the Notepad table 30 based upon the date and time regardless of the order the information was entered into the user interface. Thus, any desired date 66 and time 68 may be entered into window 60 corresponding to the timeline occurrence of the contents of the MESSAGE field 92. The program automatically positions each Notepad record in a timeline with respect to other Notepad entries.

Each Notepad data record is displayed on a separate screen. Window 60 thus works like a card file displayed in date and time sequence. Records in this display may be browsed by paging forward or backward, or by selecting the arrows 63 and 64. Moving forward or backward through the Notepad records will display each individual entry in window 60 one at a time.

The DATE field 66 holds the date of the occurrence of the present entry. As previously indicated, it is not necessary to make entries in order because the program organizes all entries by the date contained in this field automatically. As a default condition, the current date appears in the date field 66 for each new record generated. This date may be changed, however, by entering any desired date into the DATE field 66.

The TIME field 68 holds the time of day occurrence of the present entry. Hours, minutes, and seconds may be entered in field 68. As with the DATE field 66, the default time is the present time of day that the data is being entered. The TIME field 68 may be edited to reflect any desired time by entering the desired time into the TIME field 68. In addition to the DATE field 66, the program positions each Notepad record, relative to other Notepad records, in a timeline corresponding to the TIME field 68.

Each Notepad record may include information from a selected one of the various tables shown in FIG. 2 to be associated therewith. Between the TIME field 68 and MESSAGE field 92, a number of table fields are provided for user selection. User selectable table fields include a CLIENT field 70 (F5), a PROJECT field 72 (F6), a TROUBLE TICKET field 74 (F7), and ACCOUNT field 76 (F8), and a SECURITY field 78 (F9). Any one of the fields may be selected at any time either by "clicking" on the desired field or by selecting the appropriate default "F" key. Doing either causes a dot to be placed in the selected field and further causes a LIST BOX 80 corresponding to the selected table to appear on the "left" page of window 60, i.e. to the left of the simulated binder rings. For example, as shown in FIG. 4, the CLIENT table field 70 has been selected which causes a client LIST BOX 80 to appear on the "left" page. Although not shown in the FIGS., selection of any of the remaining fields 72–78 causes a LIST BOX 80 corresponding thereto to appear on the "left" page of window 60 which is nearly identical to LIST BOX 80 except for the LIST BOX contents. Data from the various LIST BOXES 80 may be selected, as more fully discussed hereinafter, to associate with any Notepad entry. Once selected, a description of the LIST BOX entry appears to the right of the corresponding table field 70–78 to provide an instant visual indication of the selected information. For example, in FIG. 4, the CLIENT field 70 has been selected. Within the CLIENT LIST BOX 80, the client HOSC has been selected as indicated by the highlighted portion 82. Once selected, the client description HOSC appears to the right of the Client table field 70.

The CLIENT field 70 contains the name of a person or company that the Notepad record relates to. Information entered in the CLIENT field 70 indicates that a pointer has been created within the database which points from the current database record to the appropriate location within the client table 34 containing the name, address and phone numbers of the selected client. Client names provide one criteria for use by the FILTER (described hereinafter) to browse through only those Notepad records relating to that client.

The client's name may be selected from LIST BOX 80 by scrolling the highlighted portion 82 to a desired client description and thereafter selecting the OK button 98. A shortcut key enables a user to find a client within the CLIENT LIST BOX 80 quickly by typing the first letter that appears in the client's name. If more than one client's name begins with the same letter, the list will scroll through each client that begins with that letter each time the letter is pressed. Once the desired client's name is selected, the user interface automatically inserts the client's name into the CLIENT field 70 of Notepad window 60 and creates an appropriate pointer within the database to point from the Notepad record to the selected client information within the client table 34.

A new client may be added to the CLIENT LIST BOX 80 by selecting the "New" button 94 at the bottom of the CLIENT LIST BOX 80. Doing so causes a window to appear (not shown) which prompts a user to enter a client's name and a security level to be associated with that client. If the client name does not exist in the CLIENT TABLE 34, an error message appears telling the user that the desired client does not exist in the CLIENT TABLE 34. The security level associated with a particular client controls access to that client. User's logged into the program will not be able to view clients in the CLIENT LIST box 90 with a higher security code than they have logged in with. Thus, the client will not appear in the CLIENT LIST BOX 80 for a particular user unless the user's security code is equal to or greater than the client's security code.

Figure 5:
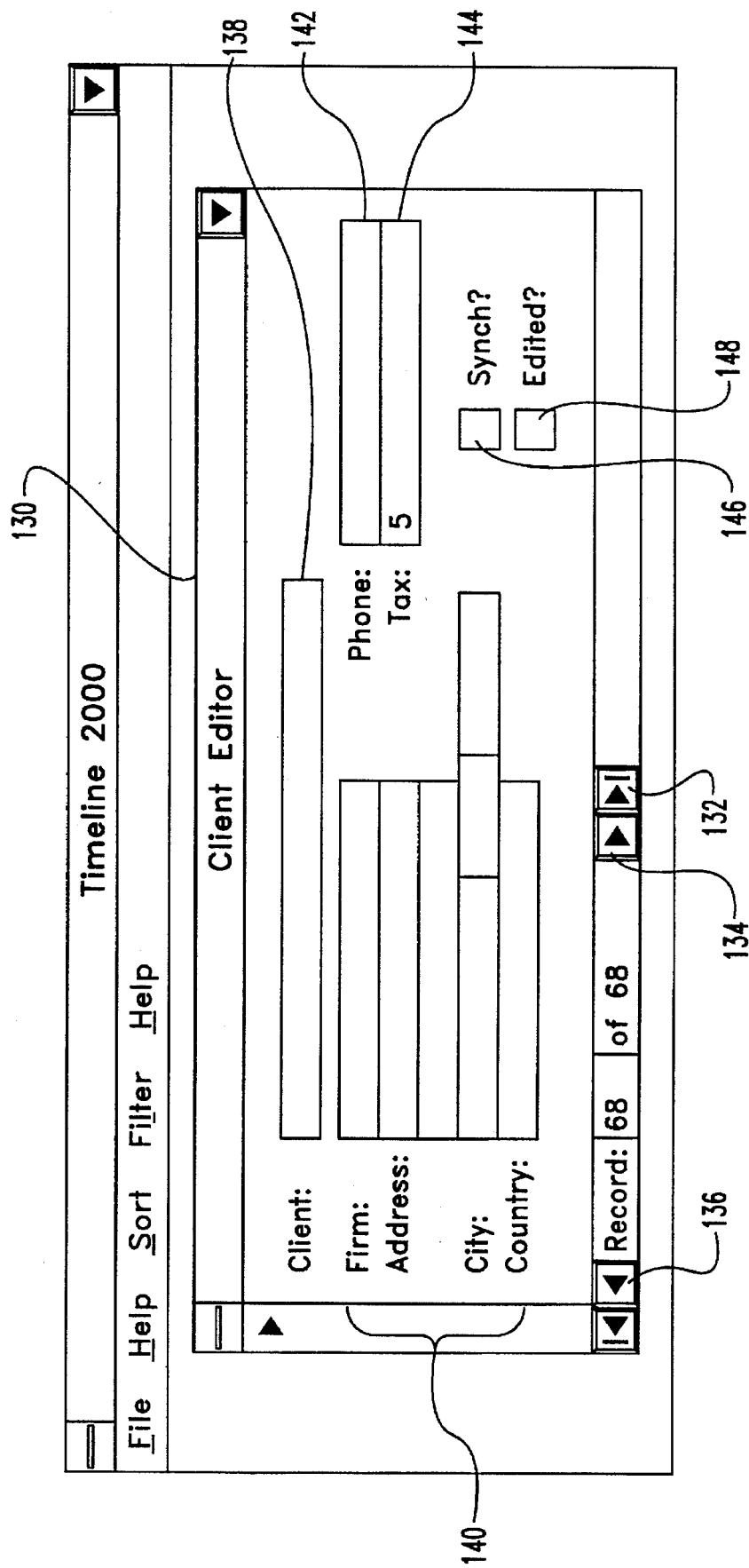
FIG. 5 is a client editor window of the user interface.

A client may be added to the CLIENT LIST BOX 80, or alternatively, information relating to a client within the CLIENT LIST BOX 80 may be edited, by selecting the "Edit" button 96 at the bottom of the CLIENT LIST BOX 80. Doing so produces a CLIENT EDITOR window 130 as shown in FIG. 5. Referring now to FIG. 5, the CLIENT NAME 138, ADDRESS 140, PHONE NUMBER 142, and SALES TAX PERCENTAGE 144 are specified for a new or an existing client. A new client may be added to the data base by selecting the LAST RECORD option 132 and depressing the page down key, or by using the shortcut keys CTRL-N from any record in the file. The PAGE FORWARD 134 and PAGE BACKWARDS 136 options may be selected to review and/or edit existing client information contained within the CLIENT TABLE 34. The SYNC 146 and EDITED 148 fields will be discussed in detail hereinafter.

Referring again to FIG. 4, a client may be deleted from the CLIENT LIST BOX 80 by first highlighting the particular client, selecting the "None" button 100 and selecting the OK button 98. The highlighted client will be removed from the record.

An OPEN ONLY field 102 is further provided at the bottom of the CLIENT LIST BOX 80. The OPEN ONLY 102 is a check only field. The OPEN ONLY field 102, or alternatively SHOW HIDDEN field, provides the user with the ability to display only particular LIST BOX 80 entries. When the OPEN ONLY field 102 is not checked (or alternatively when the SHOW HIDDEN field is checked), all LIST BOX items available to a particular user are shown in the LIST BOX 80. Conversely, when the OPEN ONLY field 102 is checked (or alternatively the SHOW HIDDEN field is not checked), only user specified LIST BOX items appear in LIST BOX 80. Specifically, only clients having an open status within the CLIENT TABLE 34 will appear in the CLIENT LIST BOX 80 when the OPEN ONLY field 102 is checked.

A WARNINGS field 104 is also provided at the bottom of the CLIENT LIST BOX 80 which is also a check only field. If the WARNINGS field 104 is checked, a warning message displays whenever a category of an existing record is being changed by the user. This feature provides the user with a chance to abort the operation being attempted without changing the category.

PROJECT field 72 provides users with another way to group related Notepad records for later viewing with a project filter. Selecting the PROJECT field 72 produces a dot in field 70, a project description to the right of field 70 and a LIST BOX 80 containing a list of projects. An advantageous use of the PROJECT field 70 is to create a project called "To Do", and to mark all entries that require action to be taken. By so doing, the "To Do" project items can be viewed each day to thereby create an automatic list of things to do without requiring re-entry of data. For items requiring action at a specific time, such as appointments, the Timeline Notepad software program of the present invention may be used in conjunction with a known calendar program having an alarm, to thereby provide a reminder function for the user.

All LIST BOX 80 functions 94–104 are identical to those described with respect to the CLIENT LIST BOX 80 with the exception that in entering a new project into the LIST BOX 80 from the PROJECT TABLE 40, the user is prompted to provide a project description and the security level associated with that project. As with the CLIENT field 70, the security level associated with a project controls access to that project. Another dissimilarity exists in editing LIST BOX 80 via the Edit button 96. Selecting the Edit button 96 produces a window showing the contents of the PROJECT TABLE 40. Data contained therein may be edited and/or added in the same manner as described with respect to the CLIENT EDITOR window 130 of FIG. 5.

TROUBLE TICKET field 74 provides users with another way to group related Notepad records for later viewing with a trouble ticket filter. Selecting the TROUBLE TICKET field 74 produces a dot in field 74, a trouble ticket description to the right of field 74 and a LIST BOX 80 containing a list of trouble tickets.

All LIST BOX 80 functions 94–104 are identical to those described with respect to the CLIENT LIST BOX 80 with the exception that in entering a new trouble ticket into the LIST BOX 80 from the TROUBLE TICKET TABLE 38, the user is prompted to provide a trouble ticket description and the security level associated with that trouble ticket. As with the CLIENT field 70, the security level associated with a trouble ticket controls access to that trouble ticket. Another dissimilarity exists in editing LIST BOX 80 via the Edit button 96. Selecting the Edit button 96 produces a window showing the contents of the TROUBLE TICKET TABLE 38. Data contained therein may be edited and/or added in the same manner as described with respect to the CLIENT EDITOR window 130 of FIG. 5.

The TROUBLE TICKET field 74 is provided primarily for service situations to permit incidents to be tracked through to their completion. Once assigned, TROUBLE TICKETS stay open until completed. Once completed, a TROUBLE TICKET is closed from the UTILITIES menu as described hereinafter. The TROUBLE TICKET NUMBER field 74 is useful for several reasons. First, open TROUBLE TICKETS provide a checklist of things to be done and should be monitored until closed. Second, TROUBLE TICKETS provide a filtering criteria for grouping certain Notepad records together (described more fully hereinafter). Third, TROUBLE TICKETS provide an additional means of grouping entries beyond the usual client, project, and account categories (described below), and may therefore be used to provide the user with an additional organization parameter.

ACCOUNT field 76 provides users with another way to group related Notepad records for later viewing with an ACCOUNT filter. Selecting the ACCOUNT field 76 produces a dot in field 76, an account description to the right of field 76 and a LIST BOX 80 containing a list of accounts.

All LIST BOX 80 functions 94–104 are identical to those described with respect to the CLIENT LIST BOX 80 with the exception that in entering a new account into the LIST BOX 80 from the ACCOUNT TABLE 32, the user is prompted to provide an accounting number, account description and the security level associated with that account. The account description is displayed in description field located to the right of field 76. As with the CLIENT field 70, the security level associated with a account controls access to that account. Another dissimilarity exists in editing LIST BOX 80 via the Edit button 96. Selecting the Edit button 96 produces a window showing the contents of the ACCOUNT TABLE 32. Data contained therein may be edited and/or added in the same manner as described with respect to the CLIENT EDITOR window 130 of FIG. 5.

The ACCOUNT field 76 is intended to identify a dollar amount entered in the AMOUNT field 84. However, use of the ACCOUNT field 76 does not require a dollar amount to be entered into the AMOUNT field 84. Thus, a user may assign an account number to a Notepad record that has no dollar amount for the purpose of tying it to another Notepad record. For example, a user may assign a common account number to all business expenditures to be reimbursed, and a different account to all non-reimbursable expenditures. A common account number may also be used to track all entries with or without expenditures related to a certain trip or incident.

SECURITY field 78 provides users with another way to group related Notepad records for later viewing with a SECURITY filter. Selecting the SECURITY field 78 produces a dot in field 78, a security level description and associated number to the right of field 78 and a LIST BOX 80 containing a list of security levels available to the user.

All LIST BOX 80 functions 94–104 are identical to those described with respect to the CLIENT LIST BOX 80 with the exception that in entering a new security level into the LIST BOX 80 from the SECURITY TABLE 36, the user is prompted to provide a security level description and the security level associated with that description. As with the CLIENT field 70, the security level associated with a account controls access to that account. Another dissimilarity exists in editing LIST BOX 80 via the Edit button 96. Selecting the Edit button 96 produces a window showing the contents of the SECURITY TABLE 36 available to the user. Data contained therein may be edited and/or added in the same manner as described with respect to the CLIENT EDITOR window 130 of FIG. 5. However, a user cannot enter a security level in this field higher than the level assigned to their account. If the security level entered is too high for that particular user, an error message appears with the message "security level restricted". Users may therefore view only the entries at a security level equal to or less than their own.

The MESSAGE field 92 contains textual data associated with the particular Notepad record. The MESSAGE field 92 behaves in accordance with most word processing programs so that, for example, text wraps to the next line and the window scrolls upward if the text entered cannot fit on one screen. Entries within the MESSAGE field 92 may be up to 64,000 characters long, thus providing a forum for a substantial amount of data.

An AMOUNT field 84 is provided next to the TIME field 68. A dollar amount may be entered into the AMOUNT field 66 which may be used, for example, for billing purposes. By using the File pull down menu option (described hereinafter), invoices may be created for a selected client wherein only entries containing a dollar amount in the AMOUNT field 66, and no account number, will appear on the invoices.

The TAX field 86 operates as a check box. Selecting field 86 causes an "X" to appear within the field. When an "X" appears in field 86, tax will be charged on the amount indicated in the AMOUNT field 84 at a rate specified in the client's master record (see FIG. 5). It is therefore possible to chose whether or not each item on an invoice is taxable since each item may be entered separately in the Timeline Notepad software program.

A USER field 88 is further provided within Notepad record screen 60. The name of the user who originally created the particular entry is shown in field 88. USER field 88 is automatically generated by the program and its contents may not thereafter be edited.

A DESCRIPTION field 90 is further provided for indicating a description corresponding to the MESSAGE field 92 of the Notepad record. During the invoicing process (described hereinafter), the program will use the first two lines of the message entry as the description of the item unless a description has been entered into the DESCRIPTION field 90. If a description is present within field 90, the description entered in this field will print in place of the first two lines of the MESSAGE field 92 on the invoices. Thus, if the text appearing in the MESSAGE field 92 is not appropriate for invoicing purposes, a more concise description may be entered within the DESCRIPTION field 90.

The SYNC field 108 and the EDITED field 106 (corresponding to SYNC field 146 and EDITED field 148 of FIG. 5), are provided to coordinate a file merge process between a master Timeline Notepad software program and a slave Timeline Notepad software program. Slave tables within the data base contain Notepad records that were made from a stand alone slave version of the Timeline Notepad software program. Notepad entries made in a stand alone slave Notepad may be merged into the master Notepad, as will be more fully discussed hereinafter. Both the SYNC field 108 and the EDITED field 106 are automatically checked for all new entries made into the Notepad program that were not entered from the master Timeline Notepad software program. Neither field may be changed by the user, and the check is removed from both the SYNC 108 and EDITED 106 fields after an entry from a slave Notepad has been merged into the master Notepad. Entries that have been so merged will still appear in the slave Notepad after the merging process. However, if the master Notepad table has copied back to the slave Notepad table, the SYNC 108 and EDITED 106 fields will be cleared. This lets the slave Notepad user know that the entries have been added to, and are available to, users accessing the master Notepad program.

If any existing entries in a slave Notepad program are changed, the EDITED field 106 is automatically checked by the program. During the merge process, this tells the system to replace the record in the master Notepad instead of adding it to the master Notepad as a new Notepad record. Thus, if the SYNC field 108 is not checked, and the EDITED field 106 is checked during the merge process, the system replaces the record in the master Notepad rather than adding it as a new Notepad record. The synchronizing process will be more fully described hereinafter.

A NEW RECORD command button 110 (or CTRL-N) is provided for adding new records to a record set. Selecting NEW RECORD button 110 adds a blank record at the end of the displayed record set. Within any newly generated record, the DATE 66 and TIME 68 fields default to the current date and time, and fields 70–78 all default to "none".

A SAVE RECORD command button 112 (or CTRL-S) is also provided which, when selected, saves the current record in the record set.

Any of the various fields of window 50 may be searched for a certain value by selecting the FIND command button 114 (or CTRL-F). If a match is found, the entire record containing the match is displayed within window 60. Window 60 also has full editing capabilities. Any of the entries in the various fields may therefore be edited if necessary. Symbol 67 indicates that no changes have been made to the Notepad record since it was last saved. If any changes have been made since the Notepad record was last saved, symbol 67 is replaced with a symbol resembling a pencil. Any undesirable changes to a Notepad record may be aborted prior to saving the record by pressing ESC before moving to another record. The Notepad window 60 is exited by either doubly selecting the top left corner of the Notepad window or by using the shortcut keys CRTL-Q (or ALT-F4). Movement between the various fields of window 60 may be accomplished by depressing the TAB key, the ENTER key, or by selecting a desired field directly with the mouse to skip over other fields.

As a time saving feature, an APPEND command button (or CTRL-A) 116 is provided for adding new records at the end of a displayed record set. Values for client, project trouble ticket, account and security will be copied to the new record but the DATE field 66 and TIME field 68 will default to the current date and time.

FILTER command button 118 (or F3) is provided to select the various filters available for viewing the Notepad records. The various Notepad records may be filtered, or grouped together, according to CLIENT 70, PROJECT 72, TROUBLE TICKET 74, ACCOUNT 76, and SECURITY level 78 information. Any combination of the filtering options may be used to view only selected Notepad records. When a filter is active, the Notepad is limited to showing just the records matching the filter criteria. Selecting the FILTER option 118 queries the entire database on the item displayed in the LIST BOX 80. Holding down the SHIFT key when selecting the FILTER option 118 will expand the current query by adding another selectable item displayed in the LIST BOX 80 to the current query. Holding down the CTRL key when selecting the FILTER option 118 will refine the current filter query by including only those records that contain the item displayed in the LIST BOX 80. Holding down the CTRL and SHIFT keys together when selecting the FILTER option 118 will re-query the entire database with no filters (except by date and time).

Once a filter is selected, the Notepad record window 60 appears with the last record displayed matching the filter criteria. The record count at the bottom of the Notepad window shows how many records match the filter criteria, and the record number currently being displayed. The records and the filter display may be browsed by paging forward and backward as described previously. Also, any field may be searched for a certain value by placing the cursor on the particular field and using the FIND function (CTRL-F). Any Notepad record viewed through a filtering stream has full editing capabilities. Any of the existing entries in the Notepad file may therefore be edited in the filtering screen if desired.

New entries may be added to the end of a filtered Notepad in the same way entries are added to a non-filtered Notepad. It is not necessary that an entry added to a filtered Notepad match the active filter category. Filters are applied to the Notepad at the time they are selected, and do not limit the type of information that can be added to the Notepad. The Notepad entries will remain mixed only until the next filtering is performed.

The FILTERING function is exited, as with any other window, by either doubly selecting the top left corner of the Notepad window currently being shown, or by using the shortcut keys CTRL-Q.

A LINK command button 120 (or CTRL-L) is also provided which is used to attach other programs and data files to a Notepad record without actually storing it with the Notepad record. Linkable items may include any multimedia data such as pictures, sound, video, word processing files, spread sheets, and data bases, that are compatible with the relational data base associated with the Timeline Notepad software program of the present invention.

When data is associated with a particular Notepad record, the LINK button 120 changes to a red "LINK". To observe the attached multimedia information, the user selects the red LINK option 120 which automatically produces the linked data. If no link exists, the LINK button 120 appears as shown in FIG. 4. Selecting the LINK button 120 in this case displays the link setup window 150 of FIG. 6.

Figure 6:
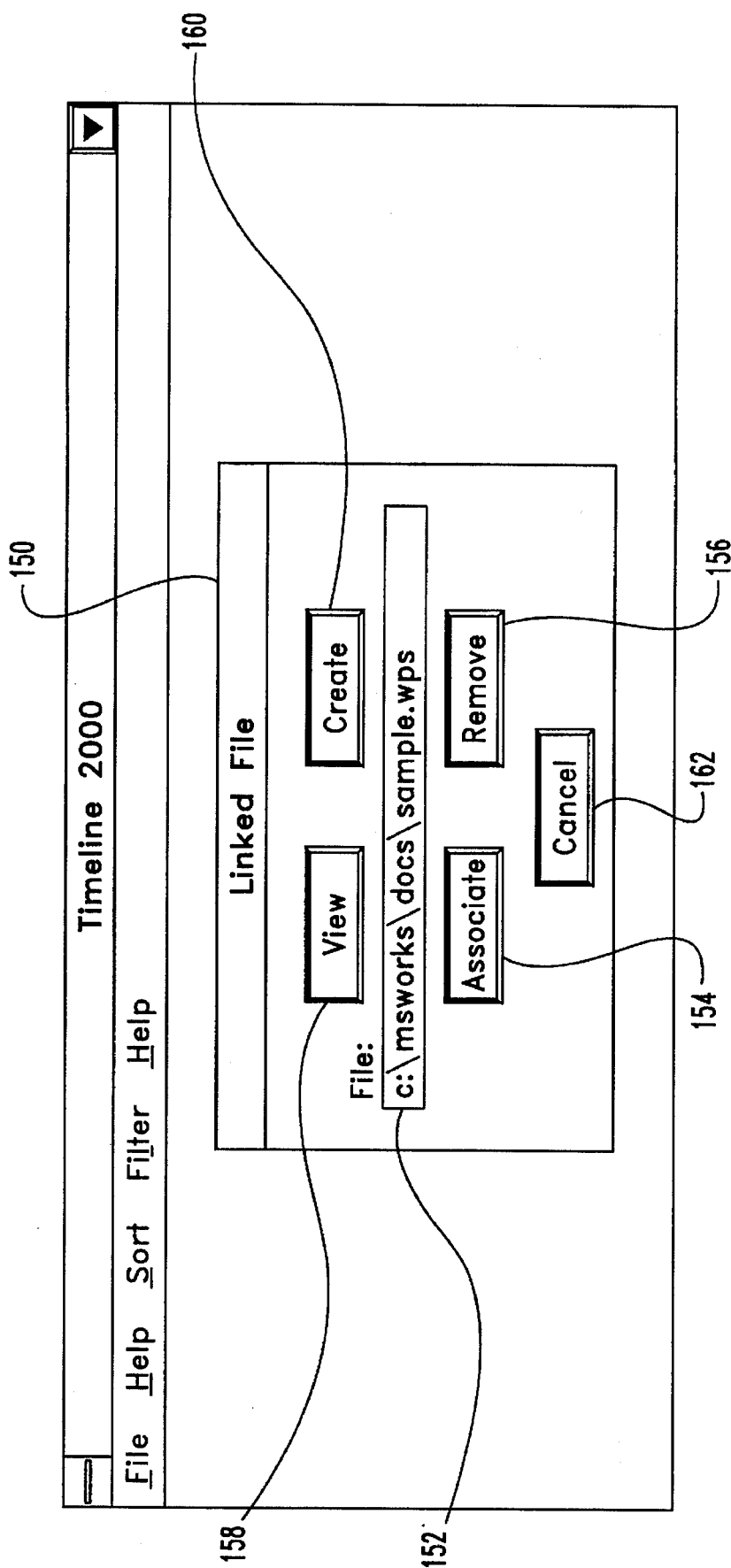
FIG. 6 is a file linking option window of the user interface.

Referring to FIG. 6, a link to a multimedia file is set up by entering the path and file name into the FILE field 152. Other programs are associated with the linked data by establishing the associations with a file type. This is a standard Windows function that is independent of the Timeline Notepad software program of the present invention. The link is established by selecting the ASSOCIATE option 154 of the LINK window 150. Once established, associations with a certain file type cause the related application program to be launched automatically whenever a file of that type is selected. The associated multimedia data may be observed from LINK window 150 by selecting the VIEW option 158.

A link can be removed, which disassociates the attached program or data file from the particular Notepad record, by selecting the REMOVE option 156 after the correct path and file name are entered in the FILE field 152. The link application may be cancelled by selecting the CANCEL option 162, which transfers the user back to the Notepad screen 60 of FIG. 4.

Figure 7:
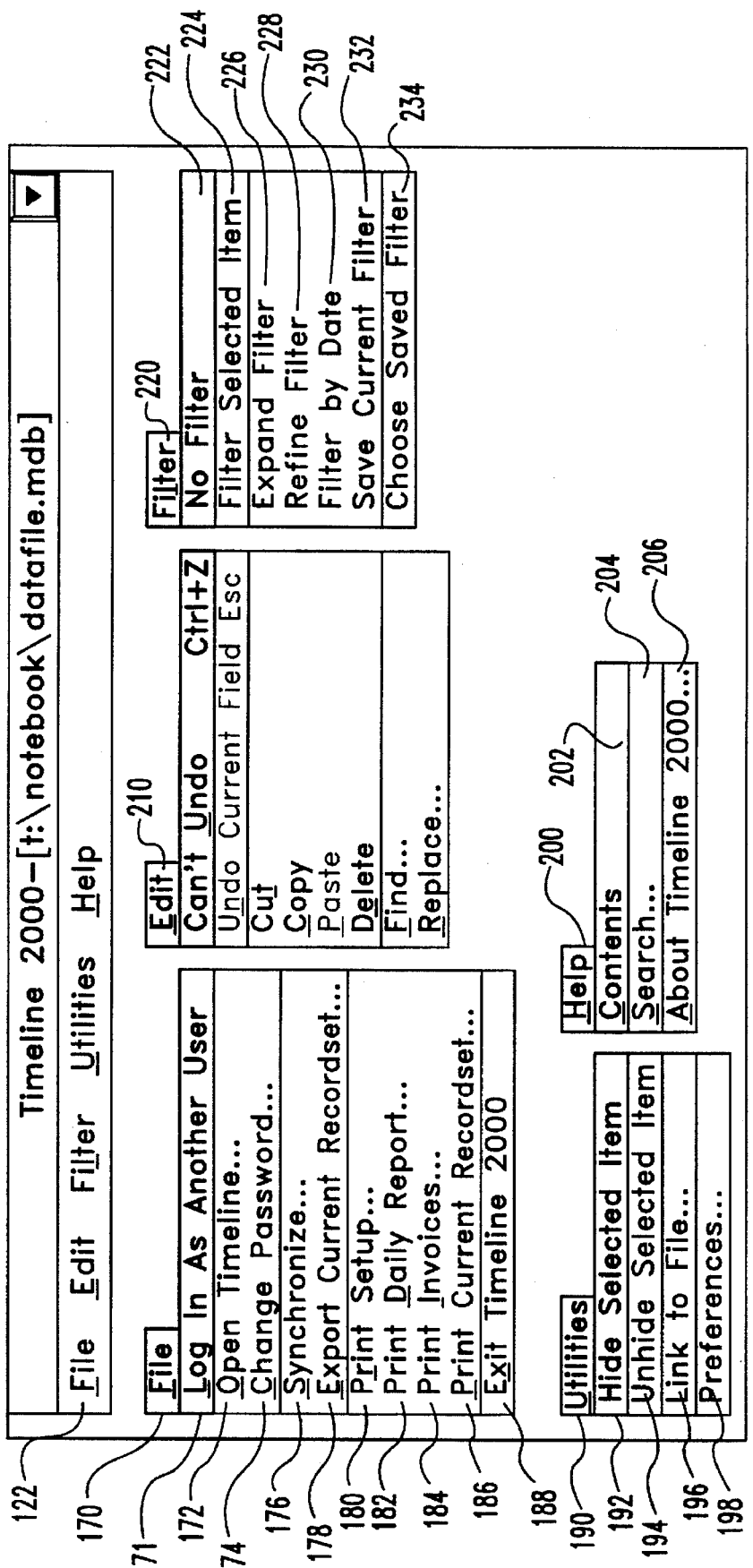
FIG. 7 is a diagram showing the various pull down menus of the user interface.

In the event that a link exists to a particular record, the link can be edited (removed, linked to another data set, etc.) by selecting the "Link to File" option 196 within the Utilities pull down menu 190 as shown in FIG. 7.

Referring once more to FIG. 4, a number of pull down menus 122 are provided for lesser used functions. The various pull down menus and their associated features are shown in greater detail in FIG. 7. Referring now to FIG. 7, the pull-down menus 122 contain several choosable functions commonly associated with Windows-based applications. For example, the EDIT menu 210 contains CUT, COPY, PASTE DELETE, FIND and REPLACE options. Similarly, the FILE menu 170 contains PRINT SETUP 178 and EXIT 188 options.

The pull down menus of FIG. 7 also include several features unique to the user interface of the present invention. For example, the FILE menu includes a "Log In As Another User" option 171 which produces window 50 of FIG. 3. This option permits a user to log in to the user interface with different security levels. An "Open Timeline" option 172 is provided to permit a user to choose from any of a number of Notepad databases. The present invention contemplates that the user interface may be used to interface with a number of Notepad databases established by a user or users. As a simple example, a user may wish to create a Notepad database for personal use and a separate Notepad database for business use. In any event, by selecting option 172, the user is prompted for the pathname of the desired Notepad database,-followed by the log on window 50 of FIG. 3. In the example shown in FIG. 7, the Notepad database pathname is t:/notebook/datafile.mdb.

Figure 8:
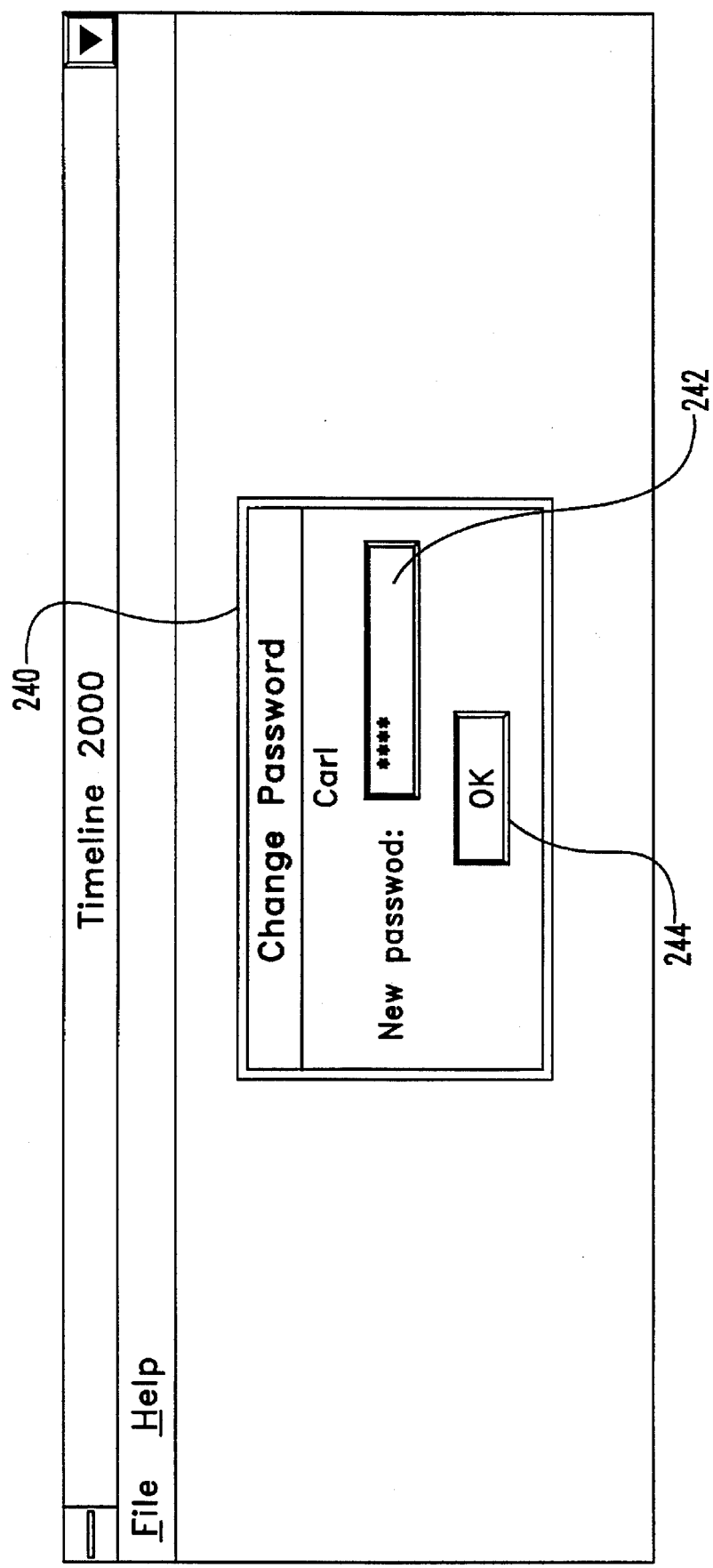
FIG. 8 is a password changing window of the user interface.

Also included within the FILE pull down menu 170 is a "Change Password" option 174. Selecting option 174 produces the CHANGE PASSWORD window 240 of FIG. 8. Referring now to FIG. 8, a new password is entered into the NEW PASSWORD field 242 and the OK button 244 is selected to establish a new password.

Figure 9:
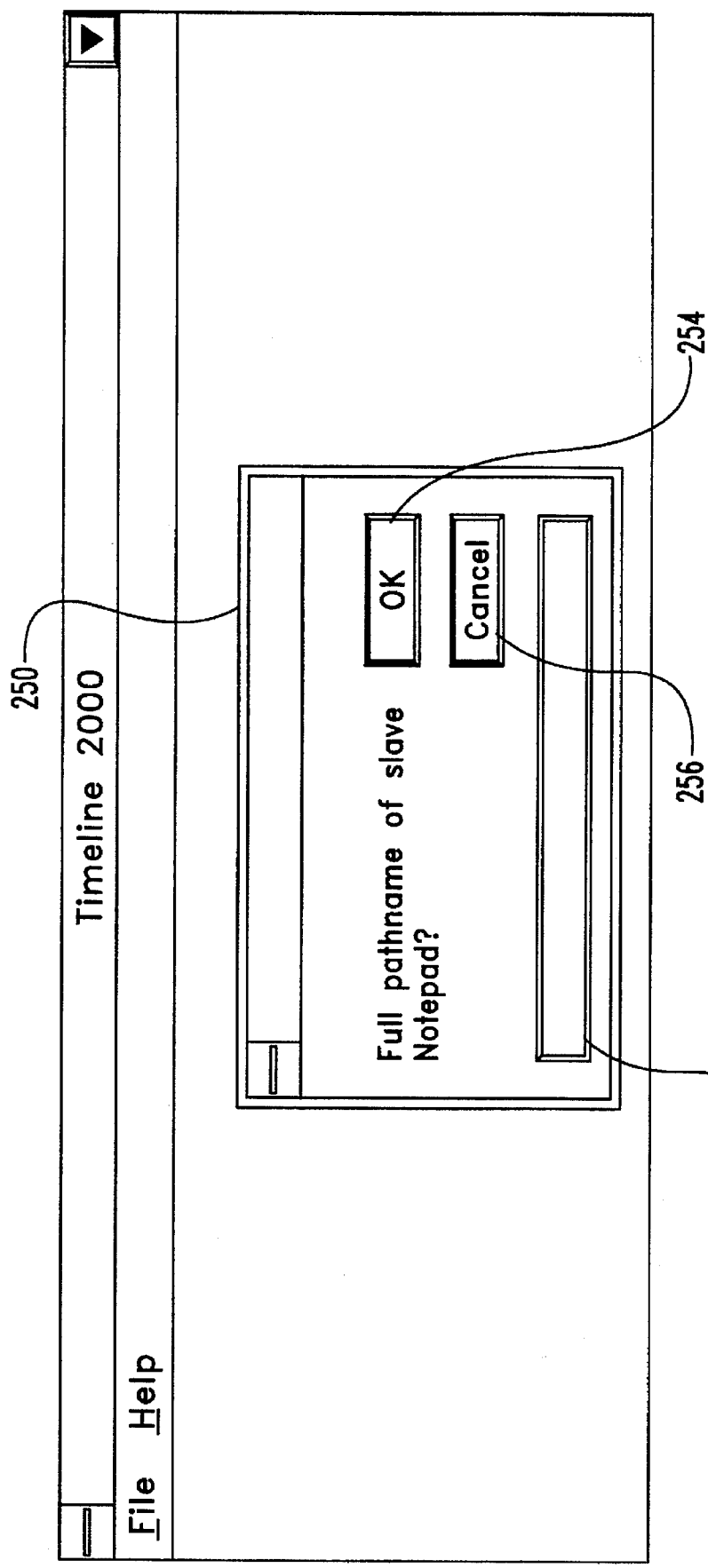
FIG. 9 is a data message import/export window of the user interface.

Referring again to FIG. 7, a "Synchronize..." option 176 is provided within the FILE pull down menu 170. By selecting the Synchronize option 176, a Synchronization window 250 is produced as shown in FIG. 9. With reference to FIG. 1, the Timeline Notepad software program of the present invention may be run in either a "master" mode or a "slave" mode of operation. The Timeline Notepad software program is typically run in the master mode on the main computer 12, or on any of the network computers NW1-NWn that may be considered to be "on-line" with the main system. The remote computer 20 is typically run in the slave mode since it does not have direct access to the Notepad data base contained in the main computer 12 and is therefore considered to be run "off-line" from the main system. The running mode of the Timeline Notepad software program of the present invention, i.e, master mode or slave mode, is selected in the Timeline.ini file located in the C:/WINDOWS directory. By making appropriate changes to this file, as is commonly known to those skilled in the art, the Timeline Notepad software program may be made to run in either the master mode or slave mode.

Referring now to FIG. 9, the Synchronization window 250 permits the merging into a master Notepad of those entries made off-line in slave mode. Synchronization window 250 includes a PATH/FILE field 252 for entering the path and file name of the Notepad file on the slave system to be merged into the master system. A slave system Notepad file may be merged from the hard drive of the slave system in, for example, a docking station set up such as that shown between remote computer 20 and main computer 12 of FIG. 1, from a memory device such as memory device 22 shown in FIG. 1, or from a generic ASCII data import/export device such as device 24 shown in FIG. 1. Typically, approximately 1000 records can be synchronized per minute depending on the speed of the computers involved, if the slave Notepad is copied from the hard drive of the slave system 20 to the hard drive of the main computer 12.

The SYNC field 108 and EDITED field 106 of Notepad record 60 (as well as Sync field 146 and Edited field 148 of the CLIENT EDITOR window 130 of FIG. 5) tell the master system how to treat a record during the synchronization process. Only a program running in the slave mode puts checks in these fields. In fact, fields 106 and 108 of FIG. 4, as well as fields 146 and 148 of FIG. 5, do not appear in windows 60 and 130, respectively, when the program is running in the master mode. Any time a record is added to the CLIENT TABLE 34 or NOTEPAD TABLE 30 (FIG. 2) on a system running in slave mode, both of these fields are checked automatically. During the synchronization process, the master system looks at the status of these fields in each slave record and adds the record to the master Notepad if both boxes are checked.

When a previously synchronized record is edited on a system running in the slave mode, only the EDIT box is checked. This tells the master system to overwrite the record during the synchronization process instead of adding it to the end of the file.

When the synchronization process is complete, all entries have been merged into the master Notepad. At this point, the slave Notepad is still unchanged, but does not contain any new entries added to the master Notepad while the slave Notepad was off-line. The slave Notepad may be updated by making a copy of the master Notepad to the slave Notepad using the FILE MANAGER in the master system as is commonly known in the art. However, it may be necessary to rename the Notepad during the copy process if the slave Notepad is using a different name.

Referring again to the FILE pull down menu 170 of FIG. 7, an "Export Current Record Set" option 178 is also provided. Selecting option 178 produces an Export Record Set window (not shown) which permits grouping of a range of Notepad records in accordance with any filtering criteria available. The Export Record Set window prompts the user for a file pathname and uses the currently selected filter criteria to select records for export to the named file.

Figure 10:
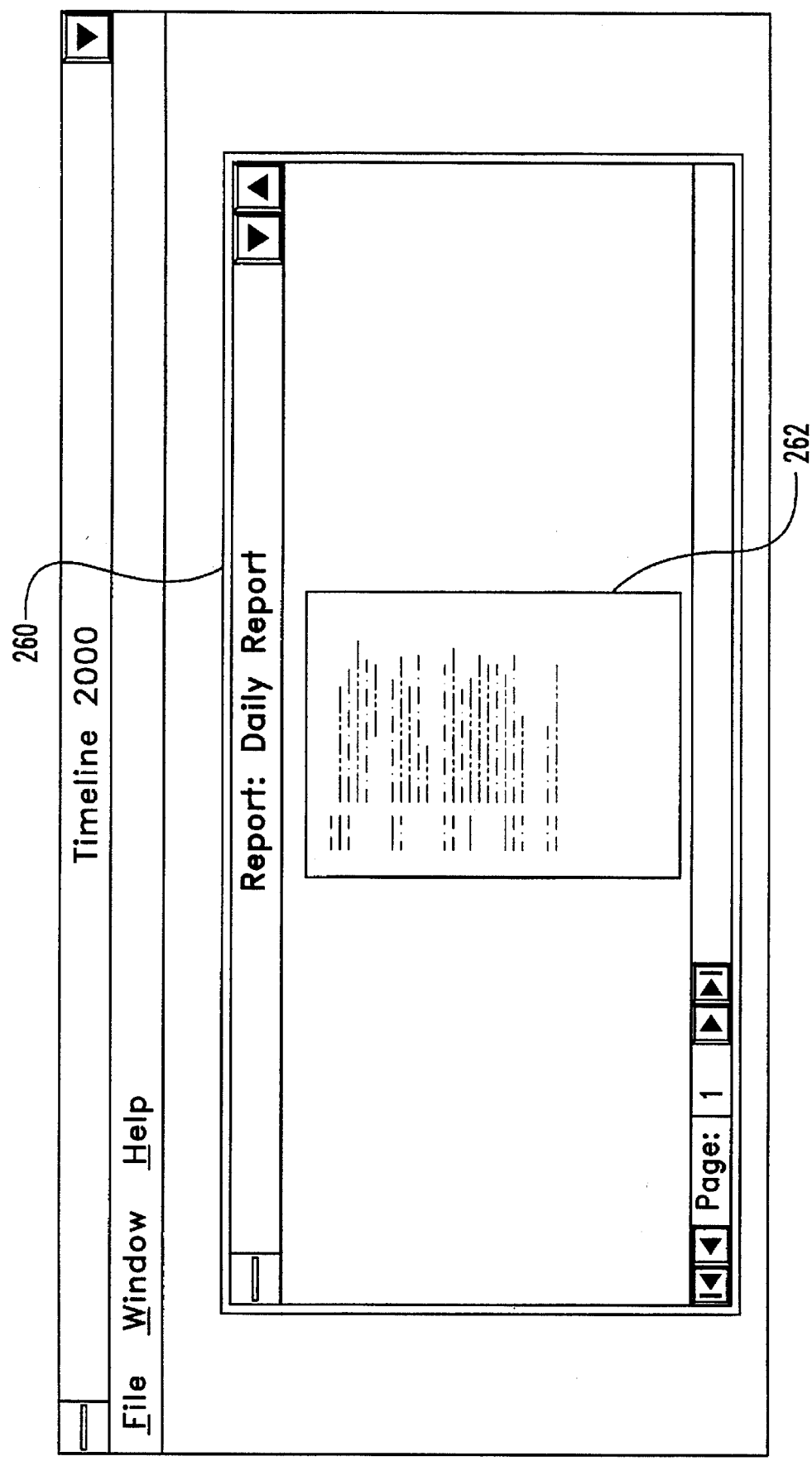
FIG. 10 is a daily report window of the program.

The FILE pull down menu of FIG. 7 further includes a Print Daily Report option 182. Selecting option 182 produces a window (not shown) prompting the user to enter the date of a particular day for viewing all Notepad entries made on that day. Upon entering the date, the DAILY REPORT window 260 is produced as shown in FIG. 10. Referring to FIG. 10, the DAILY REPORT window 260 includes a REPORT 262 displaying the date, time, client, and about the first four lines of the notes for each record for that day in the Notepad file. Records that are above the user's security clearance will not appear in the report. As is common in Windows applications, the REPORT 262 may be optionally printed by selecting the PRINT option from the pull-down file menu (not shown), or by using the shortcut key CTRL-P.

Figure 11:
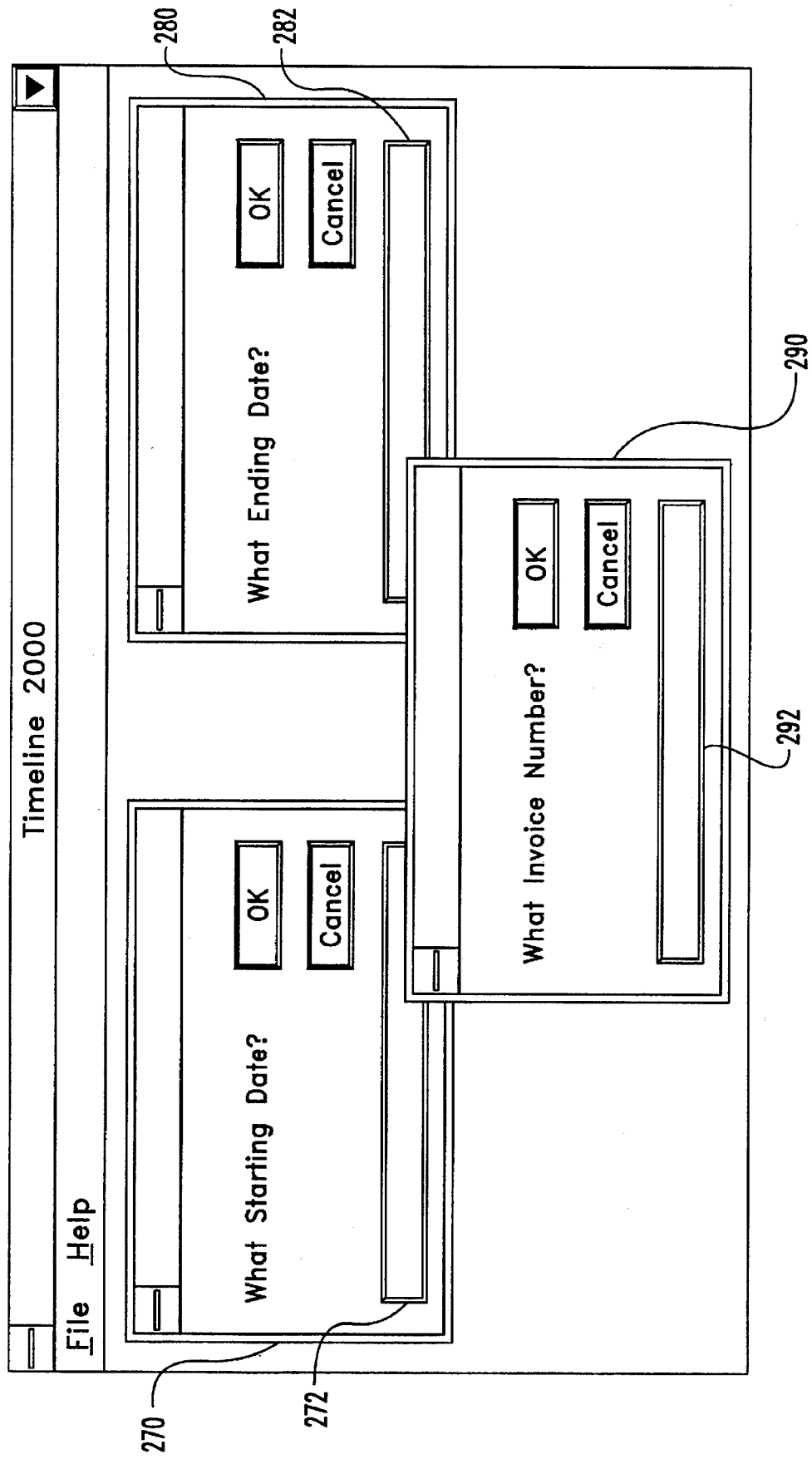
FIG. 11 is an invoice generating window of the user interface.

Referring again to FIG. 7, a "Print Invoices" option 184 is available from the FILE pull down menu 170. By selecting option 184, a series of prompting windows 270, 280, and 290 are produced as shown in FIG. 11. Referring now to FIG. 11, a STARTING DATE window 270 prompts the user to enter a starting date in a starting date field 272 corresponding to the desired starting date of a particular invoice. The ENDING DATE window 280 prompts the user to enter a desired ending date in an ending date field 282 for the particular invoice. Finally, the INVOICE NUMBER window 290 prompts the user to enter the invoice number in an invoice number field 292 for the particular desired invoice. Upon selecting a particular invoice number, a CLIENT LIST BOX, similar to CLIENT LIST BOX 80 of FIG. 4, is produced which shows only clients that have dollar amounts entered in the AMOUNT field 84 of the Notepad record 60 and no account number for the date range specified. A desired client's name is selected, using methods described above, which produces the INVOICE REPORT window 300 of FIG. 12.

Figure 12:
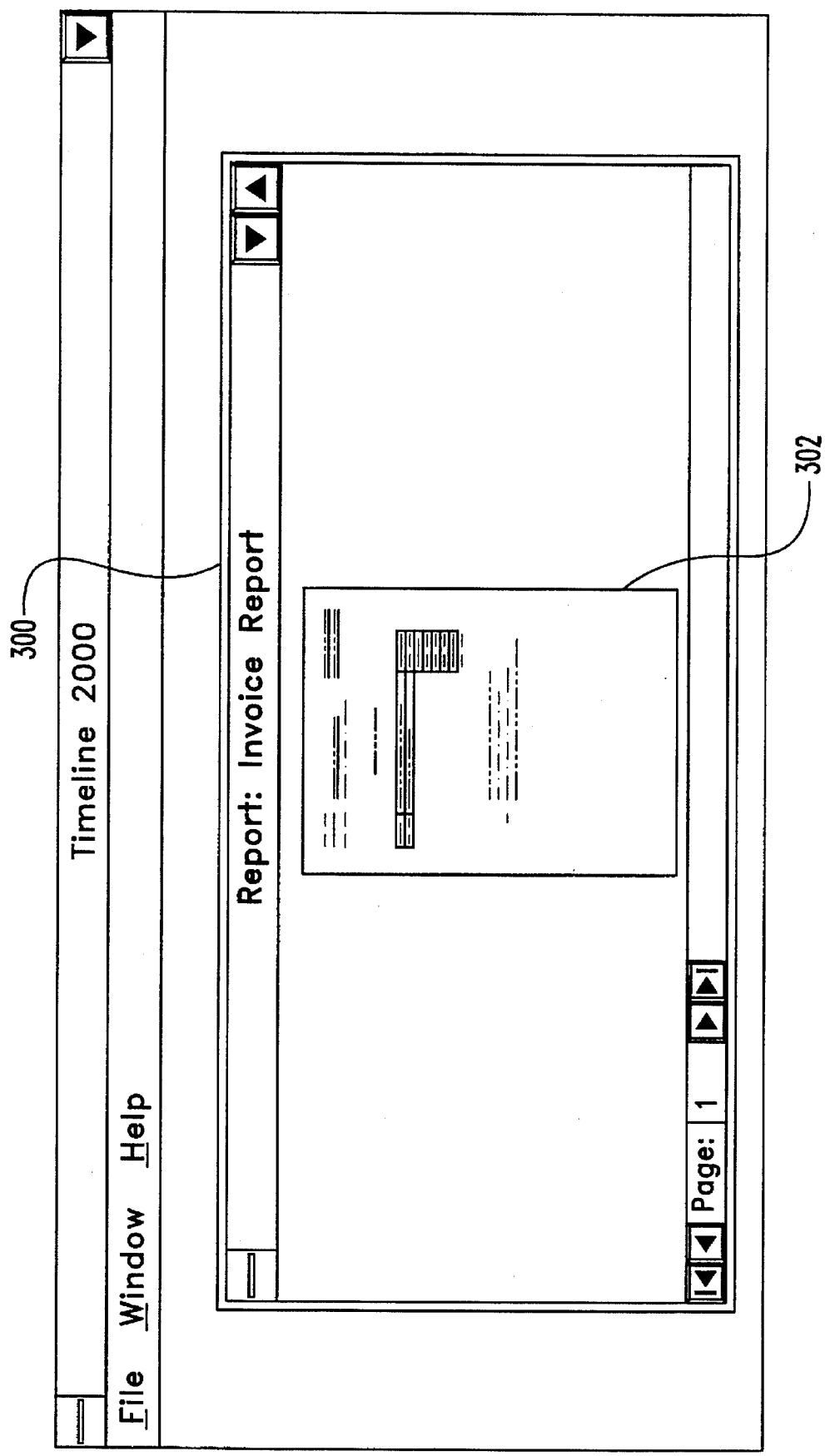
FIG. 12 is an invoice report window of the user interface.

Referring now to FIG. 12, the INVOICE REPORT window 300 includes an INVOICE REPORT 302 containing the particular client's name, address, and all records from the Notepad that contain a dollar amount for the date range specified. The description of the Notepad entries contains the first two lines of the MESSAGE field 92 (FIG. 4) unless an entry was made in the DESCRIPTION field 90 of the particular Notepad record. The text in the DESCRIPTION field 90, if present, will override the information in the MESSAGE field 92 and display as the description on the invoice item. Any items that are taxable will display an * at the beginning of the description. Subtotal, tax, and total amount due are displayed at the bottom of the invoice 302. A page count is indicated at the bottom of the DAILY REPORT window 300 if the invoice contains more than one page. The invoice may be printed as previously described.

Referring again to FIG. 7, a UTILITIES menu 190 is also provided as a pull down menu. The UTILITIES menu 190 includes a "Hide Selected Item" option 192 and an "Unhide Selected Item" option 194. These two features are used in connection with the "Open Only" field 102 of FIG. 4 (or alternatively "Show Hidden" field). In one embodiment, each Table in the database, as shown in FIG. 2, contains a status indicator indicating whether the entry has an "open" status or a "closed" status. In this case, fields 192 and 194 are used to change the status of the particular entry. In an alternative embodiment, none of the Tables in FIG. 2 include such a status indicator field. Instead, the user may use fields 192 and 194 to either "hide" or "unhide" selected entries. In this way, certain records may be hidden and others unhidden to provide another way of grouping records such as to provide, for example, the previously described "To do" list. In this alternate embodiment, window 60 includes a "Show Hidden" field in place of the Open Only field 102 shown in FIG. 4. This provides the user with a known method of hiding and unhiding data records.

Also included within the UTILITIES pull down menu 190 is a "Link to File . . . " option 196. As previously discussed, this option is provided to allow a user to change or delete a linked file associated with a Notepad record. If a linked file exists for a particular record, the linking window 150 of FIG. 6 may not be accessed with the LINK command button 120 of FIG. 4 and must therefore be accessed via option 196 of the UTILITIES menu 190.

Figure 13:
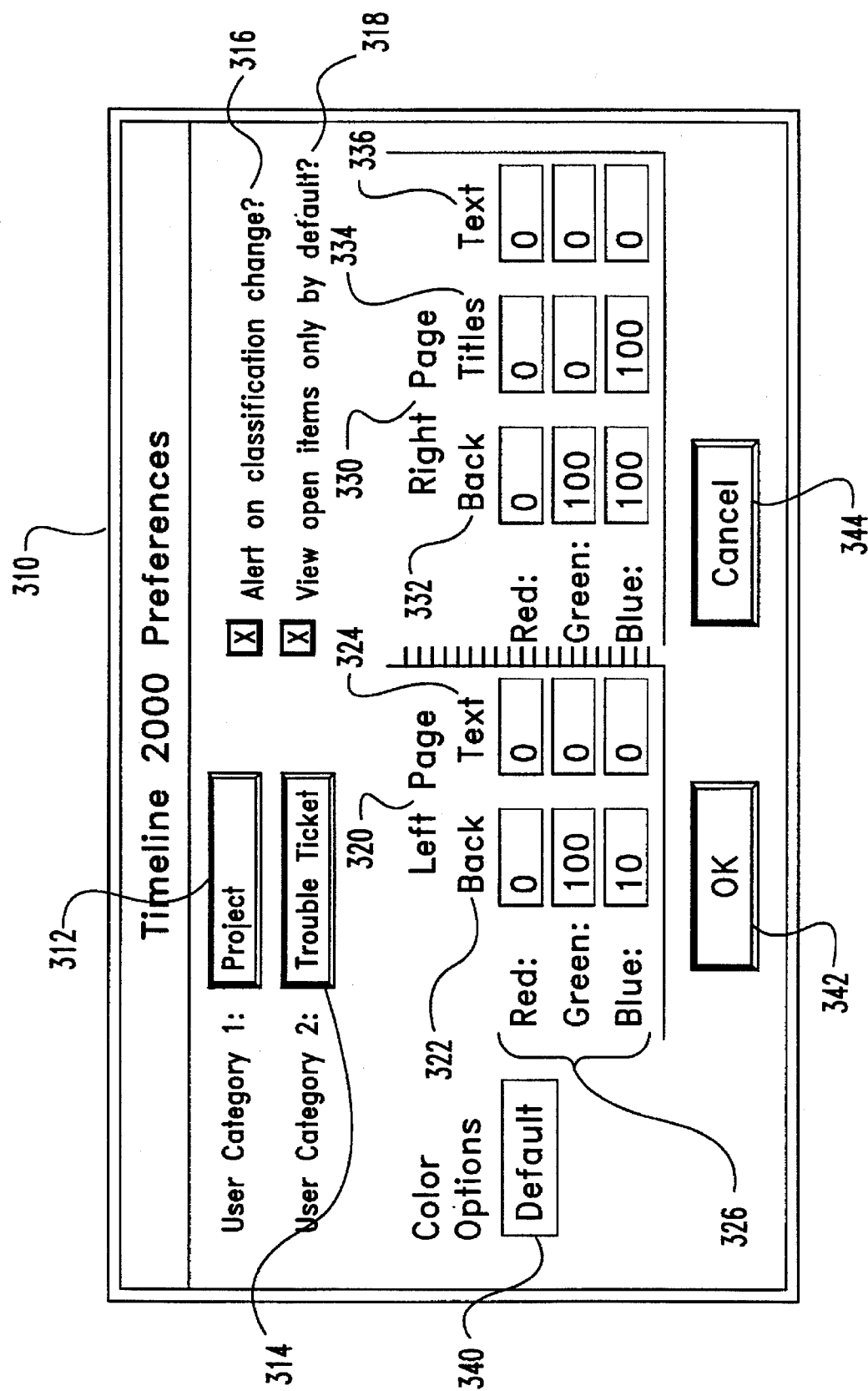
FIG. 13 is a color display preference option window of the user interface.

Finally, a "Preferences . . . " option 198 is provided within the UTILITIES menu 190. Selecting option 198 produces the Preferences window 310 of FIG. 13. Referring now to FIG. 13, window 310 includes user category fields 312 and 314 which contain the names of the PROJECT and TROUBLE TICKET field categories. With the Preferences window 310, the user may rename these categories by entering any desired names within fields 312 and 314. Fields 316 and 318 are further provided to permit a user to set default conditions for the OPEN ONLY 102 and WARNINGS 104 fields of FIG. 4. If fields 316 and 318 are both checked, the OPEN ONLY 102 and WARNINGS 104 features of FIG. 4 are operational as described with respect thereto. However, if either of fields 316 and 318 is unchecked, then no X's will appear in fields 102 and 104 by default when the program is initiated.

The Preferences window 310 further provides the user with color options for the Notepad "pages". For the "left" page 320 of the Notepad records (corresponding to the LIST BOX 80), the background 322 and text 324 colors may be altered by assigning weights to be given to red, green and blue colors 326. Similarly, the "right" page 330 (corresponding to the Message field 92 and items positioned thereabove in FIG. 4) of the Notepad records may have the background 332 and text 336 altered by assigning weights to the red, green and blue colors 326. In addition, the titles 334 of the right page may be altered in similar fashion. Generally, the color options may be selected from within range of 0–100 for each color. As a default condition, the text and titles for each page are chosen to be black by assigning full strength of red, green and blue colors thereto, and the background of the left page is chosen to be green whereas the background of the right page is chosen to be blue. The color options may be changed to their default conditions at any time by selecting the "Default" button 340. Any selections may be entered by choosing the OK button 342, or may be canceled by choosing the Cancel button 344.

The pull down menus 122 of FIG. 4 further include a Help menu 200 as common and often customary in Windows-based applications. The Help menu 200, shown in FIG. 7, includes a Contents option 202, a Search option 204 and an "About Timeline 2000 . . . " option 206 as are common in Help applications.

Finally, the pull down menus of FIG. 4 include a Filter menu 220 as shown in FIG. 7. By choosing the "No Filter" option 222, the current Notepad database is viewed in date and time sequence only. The "Filter Selected Item" option 224, when selected, filters the entire database in accordance with the item highlighted in the LIST BOX 80. The Expand Filter 226 and Refine Filter 228 options are identical to those described with respect to the Filter command button 120 of FIG. 4 and will therefore not be discussed further. A "Filter by Date" option 230 is further provided which permits a user to select a desired date range of data as a filtering criteria. By choosing option 230, the user is prompted to enter a starting date and ending date. The current filter (or no filter) is then re-filtered according to the specified date range. Such a feature is useful for extracting periodic information.

The Filter pull down menu 220 further includes a "Save Current Filter" option 232 which permits a user to construct one or more custom data filters for subsequent use. In operation, a user may build a filter by subsequent filtering criteria. As filters are applied, they are identified in a filter field 121 located within the lower left corner of the Notepad window 60 of FIG. 4. Each newly added filtering criteria is separated from the subsequent filter by a "+". In this way, the user may tell at a glance the description and order of filtering criteria applied. In FIG. 4, the Filter field 121 reads "No Filter" thereby indicating that no filter is currently being applied. When a desired filter, or combination of filters has been selected, the user may select option 232 which produces a window (not shown) prompting the user to enter the name of the filter. Any saved filter may be selected and thereafter applied by choosing the "Choose Saved Filter" option 234 of Filter pull down menu 220.

Figure 14:
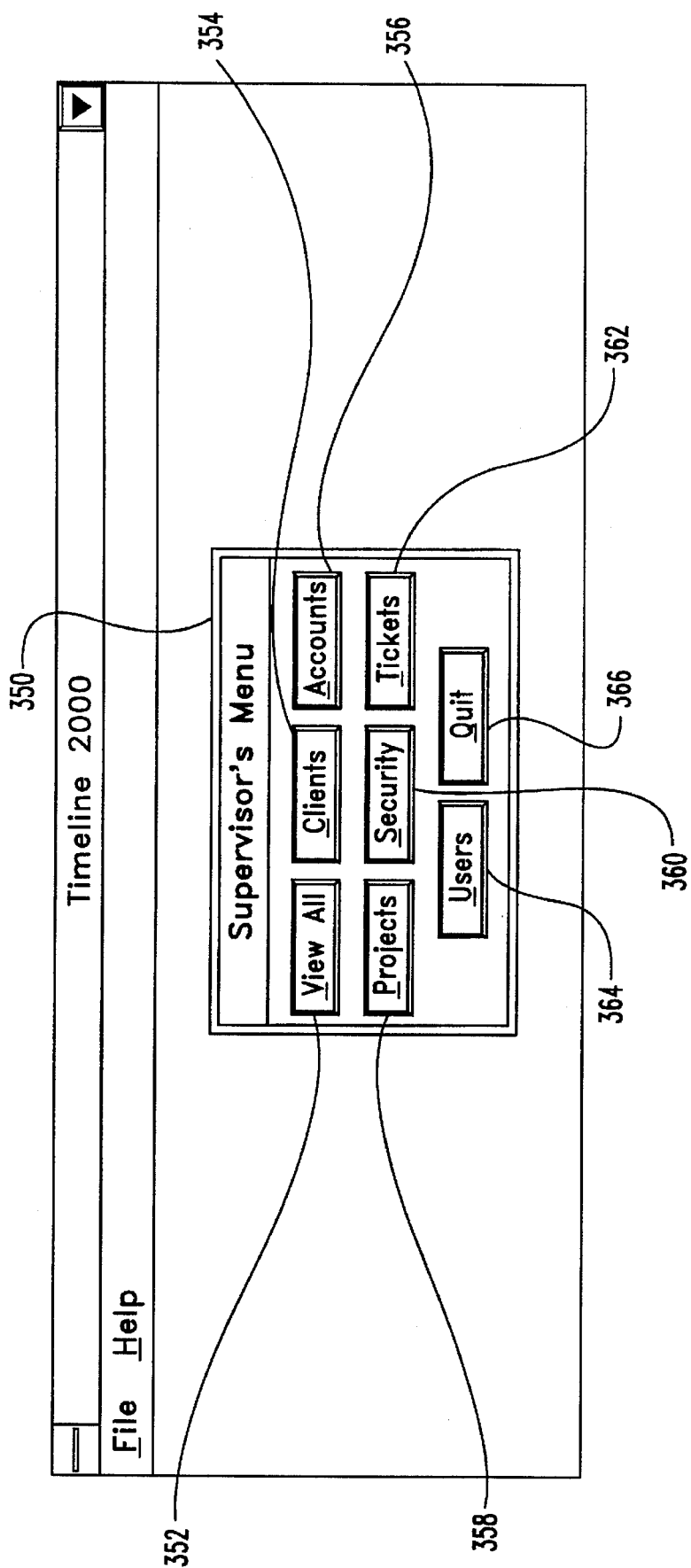
FIG. 14 is a supervisor's menu window of the user interface.

The Timeline Notepad software program of the present invention also includes a SUPERVISORY FUNCTION. If being used by a single individual, that individual is the supervisor. If, however, the program is being used in a network environment, one user is identified as the supervisor. When the supervisor logs on to the program, a SUPERVISORS MENU 350, as shown in FIG. 14, is produced rather than the Notepad window 60 of FIG. 4. Referring now to FIG. 14, each of the categories shown in the SUPERVISORS MENU; VIEW ALL 352, CLIENTS 354, ACCOUNTS 356, PROJECTS 358, SECURITY 360, TICKETS 362, and USERS 364 actually represent the correspondingly named Tables in the relational database as shown in FIG. 2, thereby permitting the multiplicity of ways to associate information in the Notepad. A new client, account, project, ticket, user, or security level is just another record in its own table as associated with the Notepad table. The VIEW ALL option 352 permits the supervisor to look at all entries in the Notepad without any filter. This means that entries appear in the order entered and not necessarily in date and time sequence. This feature is the same for all of the other tables in the SUPERVISORS MENU as well.

The supervisor has the clearance to view all records and every table in the system. The SUPERVISORS MENU 350 gives the supervisor complete access to each table using a full screen editor. The full screen editor has the appearance of the spreadsheet. Each row in the spreadsheet represents a record in the table, and each column in the spreadsheet represents a field in the table. All fields are editable when viewing a table from the SUPERVISORS MENU 350 including the SYNC and EDIT fields 108 and 106, respectively.

By choosing the CLIENTS 354, ACCOUNTS 356, PROJECTS 358, and TICKETS 362 options, the supervisor may perform all functions associated therewith that have been previously discussed. However, since the supervisor has maximum security clearance, the supervisor may perform all of the foregoing functions without any security restrictions.

Figure 15:
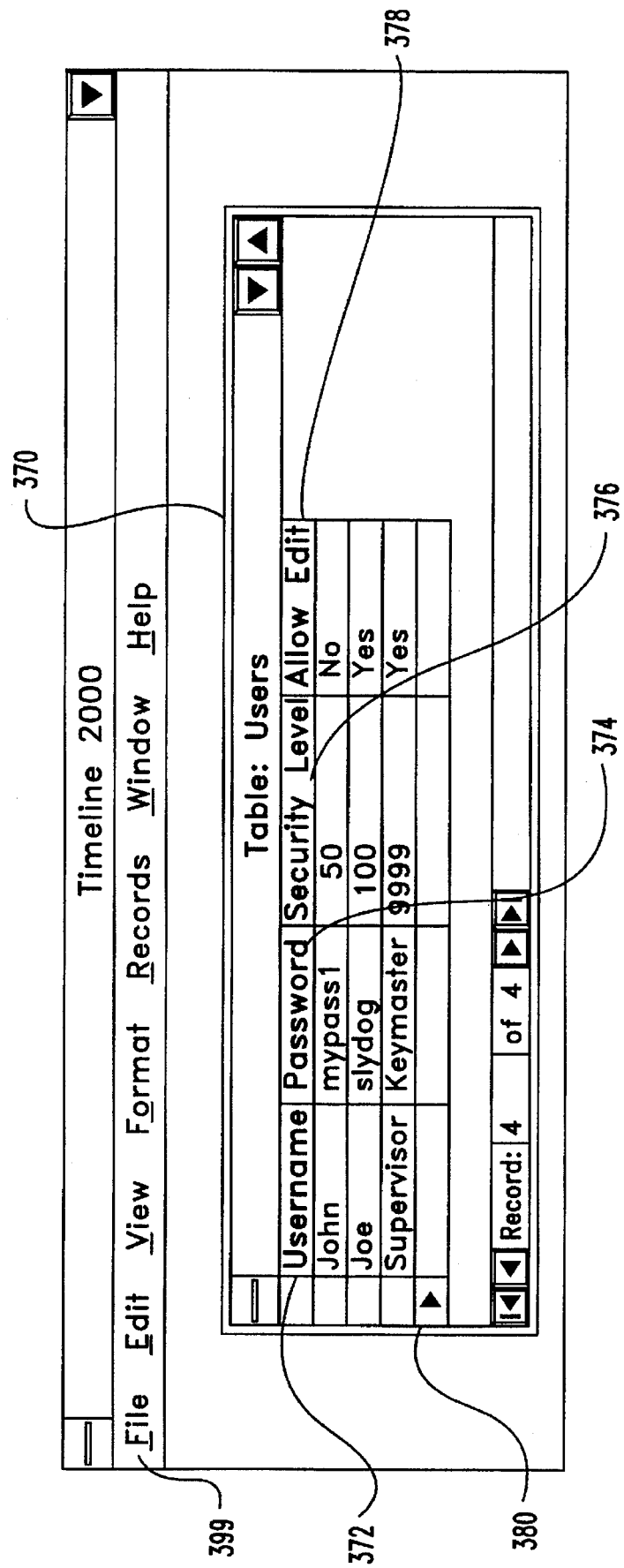
FIG. 15 is a users information table of the user interface.

Selecting the USERS option 364 produces the USERS TABLE window 370 of FIG. 15. Referring now to FIG. 15, the USERS TABLE 370 permits the supervisor to define the access permitted by each user of the program. The USERS TABLE window 370 includes a USER NAME category 372 which contains a list of user names, a PASSWORD category 374 which contains the passwords of the various users, a SECURITY LEVEL category 376 corresponding to the security level assigned to each of the users, and an ALLOW EDIT category 378 containing an indication of the editing power of each of the users.

Adding new users to the system can only be done by the supervisor. To add another user, the ENTRY IDENTIFIER 380 is selected which permits the supervisor to enter a new user name, password, security level, and whether or not editing of existing entries made by other users is allowed. The supervisor may, at any time, edit any of the fields in the USERS TABLE window 370 to thereby adjust the operating conditions of any user.

Figure 16:
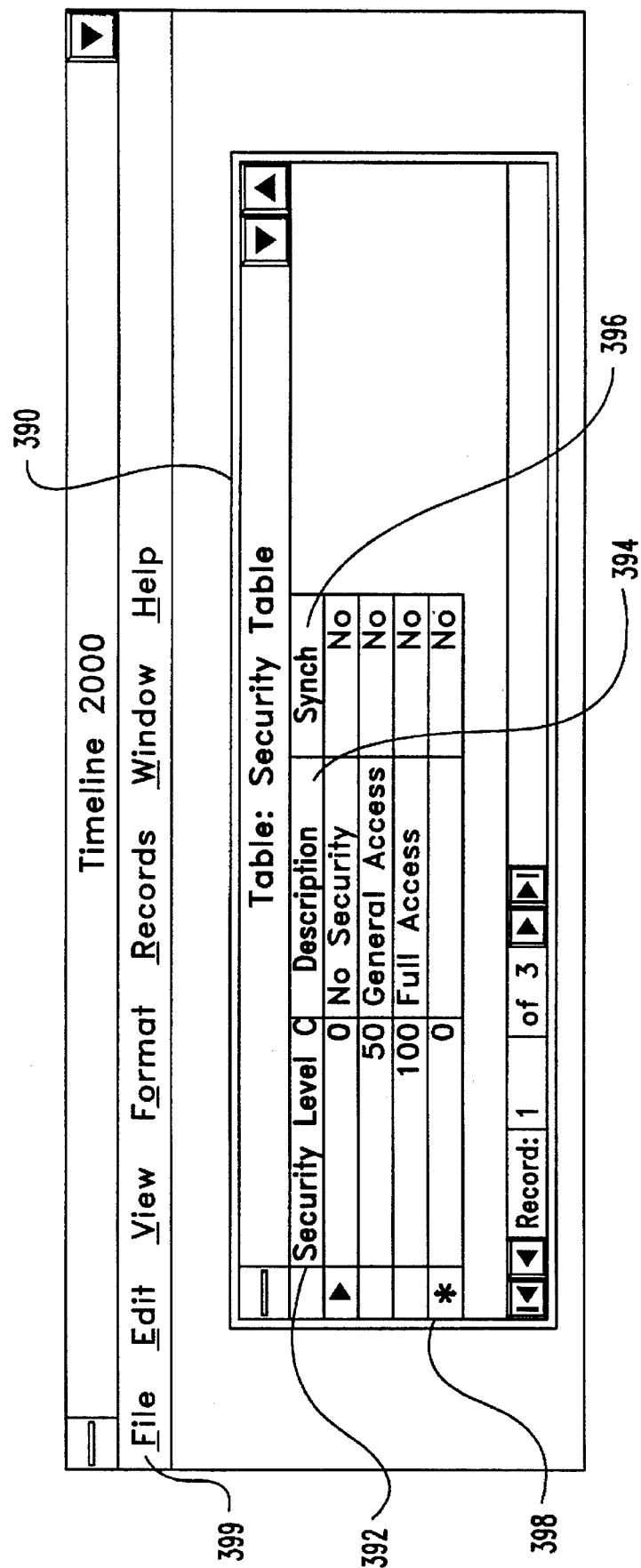
FIG. 16 is a security information table of the user interface.

Referring back to FIG. 14, a SECURITY option 360 is provided. By selecting the SECURITY option 360, the SECURITY TABLE 390 of FIG. 16 is produced. Referring now to FIG. 16, the SECURITY TABLE 390 includes a SECURITY LEVEL category 392 containing a list of security levels, a DESCRIPTION category 394 containing a list of descriptions corresponding to the various security levels, and a SYNC category 396 containing a list of sync indicators. Any of the fields within the SECURITY TABLE 390 may be edited by the supervisor, or new security levels may be created by the supervisor by selecting the "*" 398. After selecting the "*" 398, a security level (range 1–9999), DESCRIPTION and SYNC (yes or no) are entered. A "no" should be entered in the SYNC field 396 for each security level unless the new security level is being added in the slave mode. Marking the SYNC field 396 "yes" for any security level will cause the security level to be appended to the SECURITY TABLE 390 during the next synchronization.

The SUPERVISOR PULL DOWN MENU OPTIONS 399 contain advanced options available to supervisors familiar with Microsoft Access™ commands. Whenever a table is opened in the SUPERVISORS MENU window 350, these options are available. Advanced options include such features as changing the width and height of rows and columns, searching and replacing data, sorting data, hiding rows and columns, and printing, for example.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the various windows and screens may be altered in appearance and available options without detracting from the intended scope of the invention.

As a second example, the present invention further contemplates using a voice-activated processor device as the remote computer 20 shown in FIG. 1. Such a device should permit storage of wave (voice) files, or should convert incoming voice data to textual data. The stored data may then be transferred to the main computer 12 by previously discussed methods, or by other data transmission/transferal means such as by magnetic, optical, infrared, or other electromagnetic communications system.

Finally, the user interface of the present invention may also be used in a selective data reporting application. In this mode of operation, a remote application interface may be used to automatically select a saved filter so that certain preselected database records may be viewed or exported.

What is claimed is:

1. A computer system for organizing a plurality of data messages wherein each of said data messages has a user specifiable calendar date of message creation associated therewith, said computer system comprising:

a database for storing the data messages, said database storing each of the data messages having associated user specifiable calendar dates of message creation as a separate database record;

means for entering the plurality of data messages and the associated user specifiable calendar dates of message creation into said database; and a processor operable to automatically organize said database records in a timeline sequence according to the user specifiable calendar date of message creation associated with each of said database records regardless of the actual creation date of each of said database records.

2. The computer system of claim 1 wherein each of the plurality of data messages further has a user specifiable time of day of message creation associated therewith such that each of said database records includes a time of day of message creation associated therewith;

and wherein said means for entering includes means for entering a user specifiable time of day of message creation for each of said database records;

and wherein said processor is further operable to automatically organize said database records in said timeline sequence according to the user specifiable time of day of message creation associated with each of said database records regardless of the actual time of creation of each of said database records.

3. The computer system of claim 1 wherein said processor includes means for linking multimedia data with any of said database records such that said multimedia data is not stored within said database record.

4. The computer system of claim 3 wherein said multimedia data includes a computer software program.

5. The computer system of claim 1 wherein said database is a relational database.

6. The computer system of claim 1 wherein said computer system is networked with a plurality of computers and each of said plurality of computers include means for entering the plurality of data messages and associated user specifiable calendar dates of message creation into said database.

7. The computer system of claim 6 wherein each of said plurality of computers includes a processor operable to automatically organize said database records in a timeline sequence according to the user specifiable calendar date of message creation associated with each of said database records regardless of the actual creation date of each of said database records.

8. The computer system of claim 7 wherein each of said computer processors includes means for permitting variable levels of access to said database records.

9. The computer system of claim 1 wherein said means for entering the plurality of data messages and associated user specifiable calendar dates of message creation into said database includes one of a keyboard and a computer mouse.

10. The computer system of claim 1 wherein said means for entering the plurality of data messages and associated user specifiable calendar dates of message creation into said database includes memory means external to said computer system;

and wherein said computer system includes means for interfacing with said memory means to thereby receive the plurality of data messages and associated user specifiable calendar dates of message creation into said database.

11. The computer system of claim 1 further including means for outputting any subset of said database records automatically organized in said timeline sequence.

12. A method of organizing data with a computer having a processor, means for entering the data, a database for storing the data, and means for displaying the data, the method comprising the steps of:

(1) entering the data into the computer database;

(2) entering a user specifiable calendar date of data creation to be associated with the data entry into the computer database;

(3) repeating steps (1) and (2) for data associated with a plurality of calendar dates; and (4) processing and displaying the data such that each of the plurality of data entries is sequentially organized by its associated user specifiable calendar date of data creation.

13. The method of claim 12 further including the following step after completing step (2) but before the execution of step (3):

entering a user specifiable time of day of data creation to be associated with the data entry into the computer database;

and wherein step (4) further includes displaying the data such that each of the plurality of data entries is sequentially organized by its associated user specifiable time of day of data creation.

14. The method of claim 13 further including the following step prior to executing step (1):

accessing the computer with a predetermined security level;

and further including the following step after completing step (2) but before the execution of step (3):

entering a security level to be associated with the data into the computer database;

and wherein step (4) further includes displaying only data having a security level less than or equal to said predetermined security level.

15. The method of claim 14 wherein said predetermined security level is variable among users of the computer.

16. A computer system for organizing a plurality of data messages having a user specifiable calendar date of message creation and a number of filtering identifiers associated therewith, aid computer system comprising:

a database for storing the data messages, associated user specifiable calendar date of message creation, and associated number of filtering identifiers, said database storing each of the data message having an associated user specifiable calendar date of message creation and associated number of filtering identifiers as a separate database record;

means for entering the plurality of data messages, the associated user specifiable calendar dates of message creation and the associated number of filtering identifiers into said database;

means for entering filtering criteria corresponding to any of the filtering identifiers associated with any of said plurality of database records; and a processor operable to receive said filtering criteria and generate a subset of said database records having filtering identifiers in common with said filtering criteria, said subset of database records being organized in a timeline sequence according to the user specifiable calendar date of message creation associated with each of said database records in said subset regardless of the actual creation date of each of said database records.

17. The computer system of claim 16 wherein said number of filtering identifiers includes client information.

18. The computer system of claim 17 wherein said client information includes at least one of a client name, client address, client telephone number and a tax rate.

19. The computer system of claim 16 wherein said number of filtering identifiers includes account information.

20. The computer system of claim 19 wherein said account information includes at least an account description.

21. The computer system of claim 20 wherein said computer system includes an output device;

and wherein said processor is further operable to generate invoices at said output device in accordance with said account information.

22. The computer system of claim 16 wherein said number filtering identifiers includes trouble ticket information.

23. The computer system of claim 22 wherein said trouble ticket information includes at least one of a trouble ticket description and a trouble ticket status.

24. The computer system of claim 23 wherein said trouble ticket status includes an indicator of whether said trouble ticket is open or closed.

25. The computer system of claim 24 wherein said processor is further operable to generate a list of trouble tickets having an open status.

26. The computer system of claim 16 said number of filtering identifiers includes project information.

27. The computer system of claim 26 wherein said project information includes at least one of a project description and a project status.

28. The computer system of claim 27 wherein said project status includes an indicator of whether said project is open or closed.

29. The computer system of claim 28 wherein said processor is further operable to generate a list of projects having an open status.

30. The computer system of claim 16 said number of filtering identifiers includes security level information.

31. The computer system of claim 30 wherein said security level information includes at least one of a security level description and a security level number.

32. The computer system of claim 31 wherein said security level number is variable corresponding to a level of security assigned to users of said computer system.

33. The computer system of claim 16 wherein each of the plurality of data messages further has a user specifiable time of day of message creation associated therewith such that each of said database records includes a time of day of message creation associated therewith;

and wherein said processor is further operable to automatically organize said database records in said timeline sequence according to the user specifiable time of day of message creation associated with each of said database records regardless of the actual creation date of each of said database records.

34. The computer system of claim 16 further including means for outputting said subset of said database records organized in said timeline sequence.

35. A method of organizing a plurality of data messages with a computer having means for entering the plurality of data messages along with associated user specified calendar dates of message creation and a number of filtering criteria associated with each of the plurality of data messages, and a database for storing each data message, associated user specified calendar date of message creation and associated filtering identifiers as a single database record, the method comprising the steps of:

(1) entering a data message, associated user specified calendar date of message creation and associated number of filtering identifiers into the computer database;

(2) repeating step (1) for a plurality of data messages having any user specifiable calendar date of message creation associated therewith; and (3) selecting any number of filtering criteria such that only data messages having filtering identifiers in common with said selected filtering criteria are formed into a data message subset, and such that the data entries in said subset are sequentially organized by their associated user specified calendar date of message creation regardless of the actual creation date of each of paid data entries.

36. The method of claim 35 wherein the computer further includes output means;

and wherein the method further includes the following step:

(4) providing said data message subset at said output means.

37. The method of claim 36 wherein said output means is one of a monitor, a printer and means for storing data.

38. The method of claim 36 wherein step (1) further includes entering a user specifiable time of day of message creation to be associated with the data message into the computer database;

and wherein step (3) further includes forming said data subset such that the data entries in said subset are sequentially organized by their associated user specifiable time of day of message creation regardless of the actual creation time of each of paid data entries.

* * * * *